US011577155B2

(12) United States Patent
Choi

(10) Patent No.: US 11,577,155 B2
(45) Date of Patent: Feb. 14, 2023

(54) METHOD, APPARATUS AND COMPUTER PROGRAM FOR PROVIDING GAME

(71) Applicant: NEXON KOREA CORPORATION, Seongnam-si (KR)

(72) Inventor: Moon Young Choi, Seongnam-si (KR)

(73) Assignee: NEXON KOREA CORPORATION, Seongnam-si (KR)

(*) Notice: Subject to any disclaimer, the term of this patent is extended or adjusted under 35 U.S.C. 154(b) by 19 days.

(21) Appl. No.: 16/793,285

(22) Filed: Feb. 18, 2020

(65) Prior Publication Data

US 2020/0261792 A1  Aug. 20, 2020

(30) Foreign Application Priority Data

Feb. 15, 2019 (KR) .................... 10-2019-0018148

(51) Int. Cl.
 *A63F 9/24* (2006.01)
 *A63F 9/06* (2006.01)
(52) U.S. Cl.
 CPC .............. *A63F 9/0612* (2013.01); *A63F 9/24* (2013.01); *A63F 2009/2457* (2013.01)
(58) Field of Classification Search
 CPC ............. A63F 9/24; A63F 13/69; A63F 13/80
 See application file for complete search history.

(56) References Cited

U.S. PATENT DOCUMENTS

| 9,457,276 B2* | 10/2016 | Slaby ...................... A63F 13/42 |
| 9,744,460 B2* | 8/2017 | Takeda ................... A63F 13/822 |
| 2014/0274382 A1* | 9/2014 | Green ...................... A63F 13/70 463/31 |

OTHER PUBLICATIONS

Angyu, "Friends Popcorn Level 4 Attack—Ryan Escape Mission" retrieved from https://www.youtube.com/watch?v=HuUi3bGXvXA, Youtube, published online on Oct. 25, 2016, 1:06 entire video.
Hee-Soo's Game Campaign, "Friends Popcorn 1259", retrieved from https://www.youtube.com/watch?v=6Rv0eR8xt7Y, Youtube, published online on Sep. 22, 2018, 4:45 entire video.
Hee-Soo's Game Campaign, "Friends Popcorn 1219", retrieved from https://www.youtube.com/watch?v=N9pis1tYfOg, Youtube, published online on Aug. 18, 2018, 4:58 entire video.
Dong-Jin. J., "Nexon soft launch of a puzzle game Runway Story", Toyo Economy, retrieved from http://www.sateconomy.co.kr/news/articlePrint.html?idxno=50463, Sep. 12, 2018, 2 pages.

* cited by examiner

*Primary Examiner* — James S. McClellan
(74) *Attorney, Agent, or Firm* — Kilpatrick Townsend & Stockton LLP

(57) ABSTRACT

According to an aspect of the disclosure, a game providing method is provided. The game providing method includes: displaying a game interface comprising a plurality of tiles and a plurality of blocks respectively arranged on the plurality of tiles; changing an arrangement of the plurality of blocks on the plurality of tiles by identifying at least three blocks which satisfy a predetermined condition based on a user interaction; displaying a first graphic representation regarding the at least three blocks; and displaying a second graphic representation regarding at least three tiles respectively corresponding to the at least three blocks based on types of the at least three tiles.

20 Claims, 15 Drawing Sheets

METHOD, APPARATUS AND COMPUTER PROGRAM FOR PROVIDING GAME

CROSS-REFERENCE TO RELATED APPLICATION(S)

This application is based on and claims priority under 35 U.S.C. § 119(a) of Korean patent application number 10-2019-0018148, filed on Feb. 15, 2019 in the Korea Intellectual Property Office, the disclosure of which is incorporated by reference herein in its entirety.

BACKGROUND

1. Field

The disclosure relates to a game providing method, a game providing apparatus, and a game program, more particularly, to a puzzle game.

2. Description of Related Art

As technologies of devices and networks develop, a game provider provides games to users through various types of devices, and different needs of users are diversified.

A puzzle is a game genre which been loved by many users because simplicity of game rules and short play time. However, users may be easily bored by a puzzle game due to the simplicity of its game rules. Therefore, various elements have been developed to further immerse users in the puzzle game while maintaining fundamental game rules of the puzzle game.

An item may be used as one of elements in the puzzle game to immerse users in the puzzle game while maintaining fundamental game rules of the puzzle game. For example, in a match-three game having a rule of removing matched three blocks, an item of removing a certain group of blocks, such as blocks within a certain region, may be used. However, excessive uses of items lead users to be easily bored due to the overly reduced difficulty of the puzzle game. Furthermore, the simplicity of the puzzle game may be harmed if types of items or methods of their uses are too complex for users to use items in the puzzle game.

A story may be used as one of elements in the puzzle game to immerse users in the puzzle game while maintaining fundamental game rules of the puzzle game. For example, a story may proceed to interest users when users proceed to a next stage in the puzzle game. However, the story of the game does not make the game itself fun, and users who enjoy the puzzle game for its short play time usually skip the story to continue playing the game, rather than appreciating the story. Therefore, the solid story may make the game more complete, but has limitation on improving immersion of users in the game.

The above information is presented as background information only to assist with an understanding of the disclosure. No determination has been made, and no assertion is made, as to whether any of the above might be applicable as prior art with regard to the disclosure.

SUMMARY

According to an aspect of the disclosure, a game providing method is provided. The game providing method includes: displaying a game interface comprising a plurality of tiles and a plurality of blocks respectively arranged on the plurality of tiles; changing an arrangement of the plurality of blocks on the plurality of tiles by identifying at least three blocks which satisfy a predetermined condition based on a user interaction; displaying a first graphic representation regarding the at least three blocks; and displaying a second graphic representation regarding at least three tiles respectively corresponding to the at least three blocks based on types of the at least three tiles.

According to an embodiment, the plurality of tiles may be fixed, and the plurality of blocks may be movable based on the user interaction.

According to an embodiment, the first graphic representation may include a graphic representation of removing the at least three blocks from the game interface and replacing the at least three blocks with at least three other blocks.

According to an embodiment, the at least three blocks may be respectively arranged on the at least three tiles.

According to an embodiment, the plurality of tiles may include a first tile and a second tile, and the second graphic representation may include a graphic representation of changing an appearance of the second tile of the at least three tiles while the first tile of the at least three tiles remain unchanged.

According to an embodiment, a game winning requirement may be satisfied based on whether appearances of all or a predetermined number of second tiles are changed.

According to an embodiment, the plurality of blocks may include at least two obstacle blocks, and the plurality of tiles may include second tiles which connected to each other between the at least two obstacle blocks.

According to an embodiment, the first graphic representation may include a graphic representation resulting from at least one obstacle block of the at least two obstacle blocks based on whether appearances of the second tiles between the at least two obstacle blocks are changed.

According to an embodiment, a game winning requirement may be satisfied based on whether appearances of the second tiles between the at least two obstacle blocks are changed.

According to an embodiment, the plurality of tiles may include a first tile and a third tile, and the second graphic representation may include a graphic representation of changing, when the first tile and the third tile are included in the at least three blocks, an appearance of the first tile of the at least three blocks to an appearance of the third tile of the at least three blocks.

According to an embodiment, a game winning requirement may be satisfied based on whether appearances of all or a predetermined number of first tiles are changed.

According to an embodiment, the plurality of blocks may include a fixed block, and the method may further include displaying a third graphic representation regarding the fixed block when the identified at least three blocks are adjacent to the fixed block.

According to an embodiment, the third graphic representation may include a graphic representation of removing the fixed block from the game interface and replacing the fixed block with a movable block.

According to an embodiment, the plurality of blocks may include a locked block of which movement is locked, and when the locked block is included in the at least three blocks which satisfy the predetermined condition, the first graphic representation may include a graphic representation of unlocking the locked block such that the unlocked block is movable.

According to an embodiment, the changing the arrangement of the plurality of blocks may include changing the arrangement of the plurality of blocks based on whether there exist the at least three block which satisfy the predetermined condition by exchanging a position of one block selected by the user interaction with a position of a upper-adjacent block, a lower-adjacent block, a left-adjacent block, or a right-adjacent block.

According to an embodiment, the predetermined condition may include a condition where the at least three blocks have identical appearances and are arranged in a line.

According to an embodiment, the predetermined condition may include a condition where the at least three blocks have identical appearances and are arranged in a rectangle.

According to an embodiment, the identifying may include identifying a plurality of block groups including the at least three blocks which satisfy the predetermined condition, and the first graphic representation may include a graphic representation of removing the plurality of block groups from the game interface and replacing the plurality of block groups with other blocks.

According to another aspect of the disclosure, a computer readable medium is provided. The computer readable medium stores instructions which, when executed, cause at least one processor to carry out the game providing method.

According to another aspect of the disclosure, a game providing apparatus is provided. The game providing apparatus includes a memory storing instructions; and at least one processor configured to execute the instructions to: display a game interface comprising a plurality of tiles and a plurality of blocks respectively arranged on the plurality of tiles; change an arrangement of the plurality of blocks on the plurality of tiles by identifying at least three blocks which satisfy a predetermined condition based on a user interaction; display a first graphic representation regarding the at least three blocks; and display a second graphic representation regarding at least three tiles respectively corresponding to the at least three blocks based on types of the at least three tiles.

DETAILED DESCRIPTION

Figure 1A:
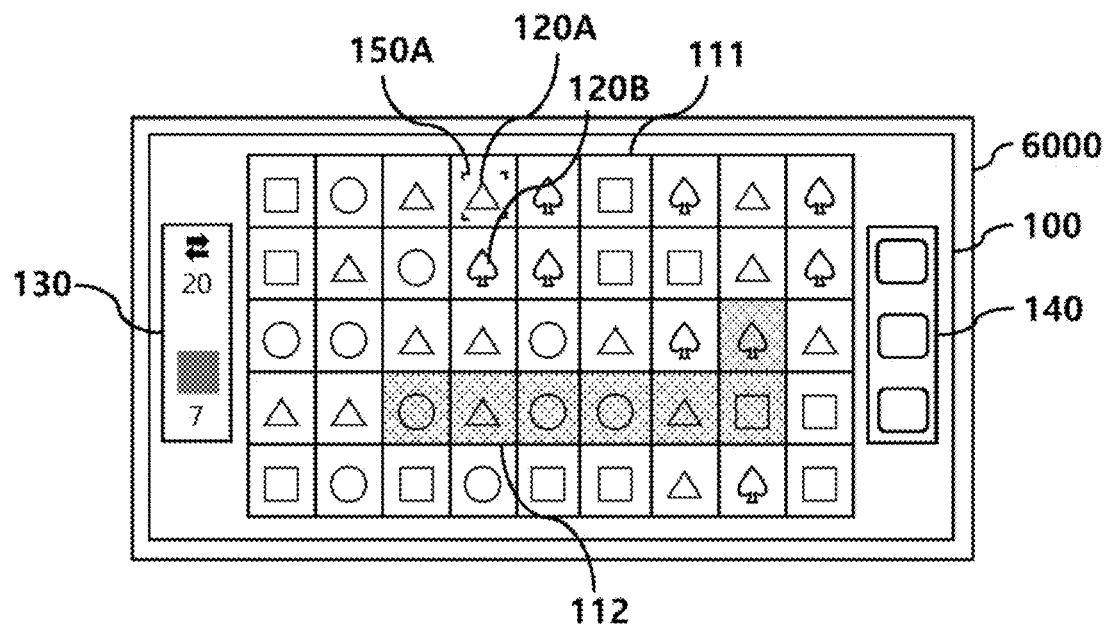
FIG. 1A, FIG. 1B, FIG. 1C, FIG. 1D, and FIG. 1E illustrate game interfaces including tiles according to an embodiment.

Hereinafter, exemplary embodiments are described in detail with reference to the accompanying drawings. By referring to contents illustrated in the accompanying drawings, a method, apparatus, computer program, and a computer program product according to an embodiment is explained. Like reference numbers in the drawings may indicate identical, functionally similar, and structurally similar components.

Terms including ordinals, such as first, second, etc. may be used to identify various components, but the components are not limited by the terms. These terms are used for the purpose of distinguishing one component from another. For example, a first component may be referred to as a second component. Similarly, a second component may also be referred to as a first component. The term "and/or" includes any combination of a plurality of related items or any one of a plurality of related items.

Terms used herein are used to illustrate embodiments, and are not intended to limit or restrict the disclosure. Herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination.

When an element is "connected" to another element, the elements may not only be "directly connected", but may also be "electrically connected" via another element therebetween or wirelessly. Herein, it should be understood that the terms "comprises," "comprising," "including," and "having" are inclusive and therefore specify the presence of stated features or components, but do not preclude the presence or addition of one or more other features or components. The term " . . . unit", " . . . module", etc. may refer to a unit in which at least one function or operation is processed and may be embodied as hardware, software, or a combination of hardware and software.

Herein, a "terminal" may refer to a user, a gamer, a player, and an apparatus, such as an electronic device, used by the user, the gamer, or the player, depending on the context. Herein, a user, a gamer, or a player may refer to an avatar or a character controlled by the user, the gamer, or the player, and may refer to an apparatus used by the user, the gamer, or the player, depending on the context.

Herein, a platform to which terminals is connected may indicate a community to which users of the terminals belong. For example, the platform may be a game, or a virtual game space provided by a game, but is not limited thereto. An avatar or a character of a user may exist in the virtual game space. The platform may be a centralized platform operated on a server to which terminals are connected. The platform may be a decentralized platform operated on the terminals which are connected to each other or nodes to which the terminals are connected.

Herein, a game may be a puzzle game, such as a match-three game, but is not limited thereto. A game interface of a match-three game may include a game board which has a certain appearance and size. A puzzle of the match-three game may be solved by users interacting blocks arranged on the game board. The blocks may be arranged on the game board randomly or by a predetermined algorithm. For example, the puzzle of the match-three game may be solved by having three or more blocks of similar or identical appearances to be arranged in a line. Blocks of similar or identical appearances may be referred to as matched blocks. Three or more matched blocks arranged in a line may be removed from the game board, and their vacancies may be filled with other blocks. The match-three game may consist of a plurality of stages, and each stage may be represented as a different game board, but is not limited thereto. A variety of winning requirements to accomplish a mission in the match-three game may be used according to an embodiment. For example, the match-three game may be implemented to satisfy a winning requirement when certain blocks or a certain number of blocks are removed from the game board, but is not limited thereto. The winning requirement may include limitation on total moves of blocks or playtime. The number of blocks to be removed in one stage may be adjusted or the total moves of blocks, playtime, and etc. may be limited to adjust difficulty of the game, but is not limited thereto. According to an embodiment, a match-three game may be implemented to remove four matched blocks arranged in a rectangle from the game board.

Herein, a block indicates an element controlled by users in a match-three game, and users solve a puzzle of the match-three game by controlling blocks in the match-three game. For example, users may interact with blocks arranged on the game board randomly or by a predetermined algorithm to arrange matched blocks in a line by exchanging positions of blocks. The blocks may include an ordinary block which is movable to exchange its position with an adjacent block. The blocks may include an obstacle block or a fixed block which is unmovable and not allowed to exchange its position with other blocks. The blocks may include a locked block which is allowed to exchange its position with other blocks when a predetermined condition is satisfied. When the predetermined condition is satisfied, the locked block may be unlocked and become movable.

Herein, a tile may indicate a space where a block is located in the match-three game, and may be represented in two dimensions or three dimensions. Tiles may be fixed on the game board and not movable in the match-three game. When tiles are represented in two dimensions, blocks arranged on the tiles may move in a certain direction through a two-dimensional plane. The blocks may move in four directions of up, down, left, and right, but are not limited thereto. For example, the blocks may move in three directions, five directions, six directions, etc. When blocks move in four directions, the blocks may be represented as a rectangle shape. A position of block may be changed with a position of adjacent block across a boundary of a tile. When blocks move in six directions, the blocks may be represented as a hexagonal shape. When tiles are represented in three dimensions, blocks may switch their positions with adjacent blocks across boundaries of tiles. For example, when blocks move in six directions through a three-dimensional plane, the blocks may be represented as a cubical shape.

Tiles may be filled with blocks, but may be vacancies which are not filled with blocks. Variety of algorithms to fill a vacancy with a block may be used according to an embodiment. According to an embodiment, after matched blocks are removed, their vacancies may be filled with blocks previously located above the matched blocks, but are not limited thereto. For example, the vacancies may be filled with blocks located on the left or the right of the matched blocks, located next to the matched blocks, or located below the matched blocks. According to an embodiment, a block generated randomly or by a predetermined algorithm may be used to fill the vacancy.

The match-three game may be displayed by a combination of variety of graphic representations. A graphic representation of the match-three game may include a graphic object of a tile or a block as well as a graphic effect regarding the tile or the block. A graphic representation may not only satisfy visual sense of users playing a puzzle game, but also help users to understand game rules of the puzzle game by visualizing a sequence resulting from a user interaction based on rules or algorithms of the puzzle game. In an example of a match-three game, three or more matched blocks may be arranged in a line by a user substituting one block with an adjacent block, and a graphic representation of bursting the matched blocks like balloons may be displayed. Accordingly, the user may be aware that the matched blocks are removed from a game board, and intuitively recognize a rule of the match-three game, that is, to remove blocks by arranging matched blocks in a line. Appropriate graphic representation may allow users to understand intuitively a rule of a game.

Users may be provided with items in a match-three game in order to make the match-three game more enjoyable. An item may be implemented as a movable element in a game board and may be referred to as an item block. An item may be implemented as a selectable element outside the game board and may be referred to as a special item. When an item block is selected, a sequence resulting from a characteristic of the item block may be produced in the match-three game. Upon use of an item block, blocks located in the same line with the item block, blocks located within a certain range from the item block, or blocks corresponding to the item may be removed. Item blocks may be combined together to be used. For example, when an item block for removing blocks located in the same line with the item block, and an item block for removing blocks located within a certain range from the item block interact with each other (positions of two item blocks are switched), blocks located within a certain range from the line may be removed. When a special item is selected and a certain point to use the special item is specified, a block on the point, blocks located in a line passing the point, blocks located within a certain range from the point, or blocks corresponding to a block on the certain point may be removed. Furthermore, an item to adjust the number of blocks to be removed in one stage or the total moves of blocks, playtime, and etc. may be provided to users.

An aspect of the disclosure is to provide a way to immerse users in a game while maintaining fundamental game rules of the game.

Another aspect of the disclosure is to provide a way to provide users with a new assignment in a match-three game.

FIG. 1A, FIG. 1B, FIG. 1C, FIG. 1D, and FIG. 1E illustrate game interfaces including tiles according to an embodiment.

Referring to FIG. 1A, a game providing apparatus 600 may display a game interface 100 to provide users with a game. The game interface 100 may include a game board consisting of a plurality of tiles, such as an ordinary tile 111 and a special tile 112, and blocks, such as blocks 120A and 120B, located on tiles. Herein, terms "ordinary tiles" and "special tiles" are named to distinctively describe their roles at a certain moment in a game, thus, ordinary tiles may become special tiles, or special tiles may become ordinary tiles. The game board may have a certain appearance and a certain size. Referring to FIG. 1A, the game board may have a rectangular shape with 9×5. The game board of 9×5 may consist of 45 tiles, and 45 blocks may be located on 45 tiles, respectively. The game interface 100 may further include a progress window 130 for indicating a progress state of the game, and an item window 140 for indicating special items in the game.

According to an embodiment, the progress window 130 may indicate an available number of moves to move a block. Referring to FIG. 1A, a user may move a block at most 20 times to satisfy a winning requirement. A variety of winning requirements may be considered in a match-three game according to an embodiment. According to an embodiment, the progress window 130 may indicate more of winning requirements. For example, referring to FIG. 1A, a winning requirement is satisfied by changing appearances of 7 tiles.

According to an embodiment, the item window 140 may indicate available items and purchasable items.

According to an embodiment, the game providing apparatus 6000 may detect a user interaction. When the game providing apparatus 6000 includes a touch screen display, a user interaction may be detected as a touch input on the touch screen display. Referring to FIG. 1A, a block 120A is selected based on a user interaction, and an indicator 150A may be displayed in the game interface 100 to show that the block 120A is selected.

Figure 1B:
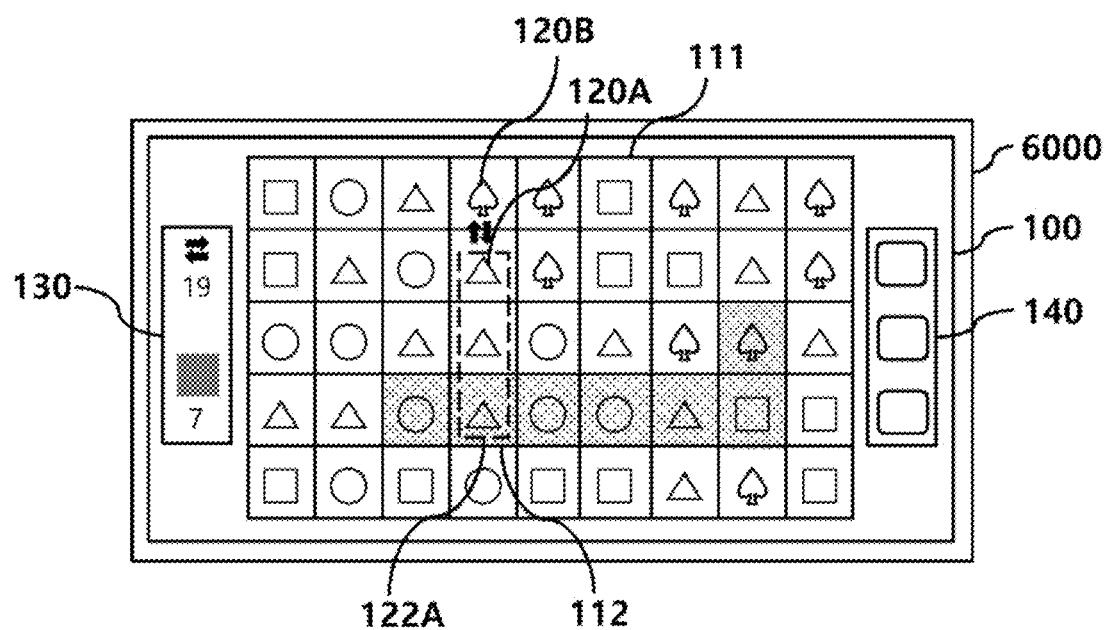
Figure 1C:
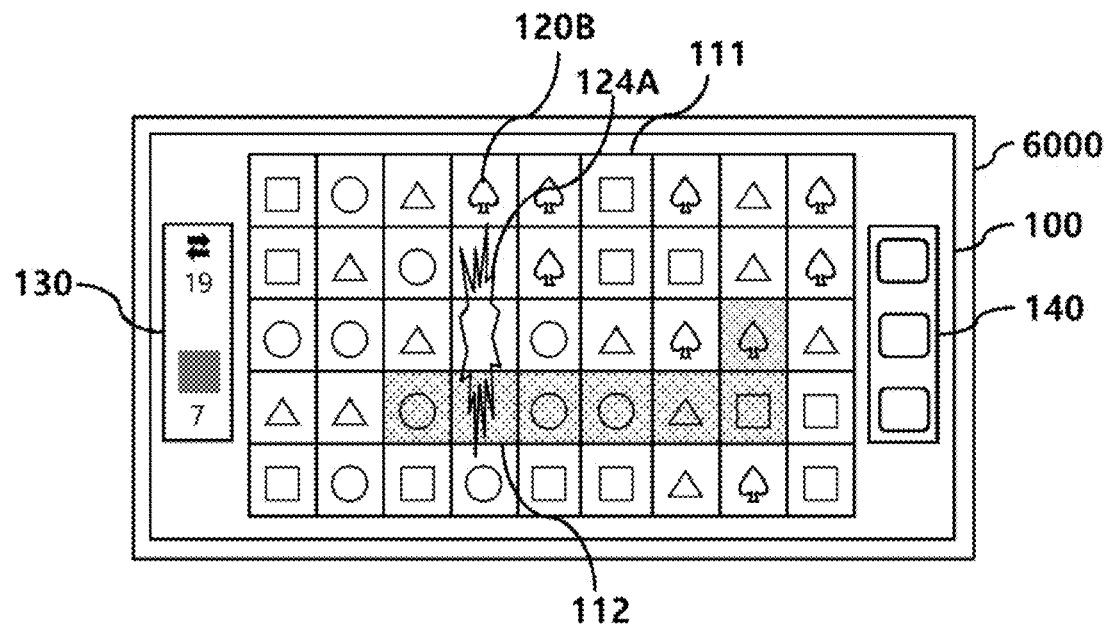
Figure 1D:
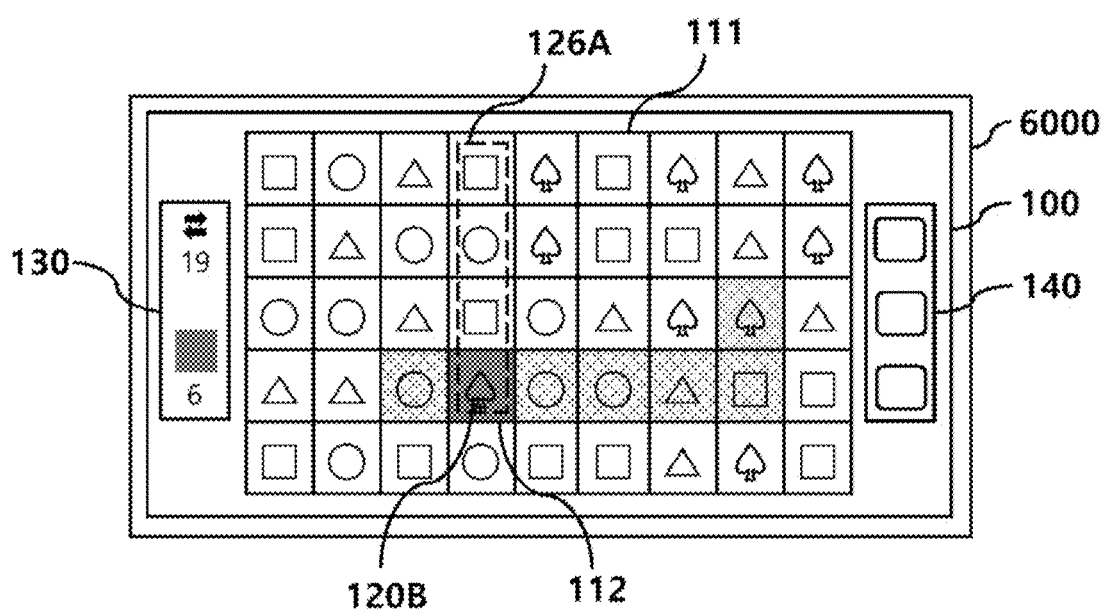

According to an embodiment, the block 120A may move in four directions of up, down, left, or right. Accordingly, the block 120A may switch its position with an upper-adjacent block, a lower-adjacent block 120B, a left-adjacent block, or a right-adjacent block. Referring to FIG. 1B, a position of the selected block 120A is switched with a position of the lower-adjacent block 120B, and three matched blocks 122A including the selected block 120A may be arranged in a line accordingly. According to an embodiment, the matched blocks 122A may have identical or similar appearance, but are not limited thereto. After the selected block 120A moves down one tile to substitute the adjacent block 120B, an available number of moves to move a block may decrease by 1. Referring to FIG. 1C, a graphic representation 124A of bursting three matched blocks 122A may be displayed in the game interface 100, which may let a user to recognize that the matched blocks 122A are removed. Empty tiles from which the matched blocks 122A are removed may be filled with other blocks. Referring to FIG. 1D, blocks 126A located above the matched blocks 122A may fill the empty tiles after the removal of the matched blocks 122A. The blocks 126A filling up the empty tiles may include the adjacent block 120B substituted by the selected block 120A. Three blocks other than the adjacent block 120B among the blocks 120A may be generated randomly or by a predetermined algorithm.

According to an embodiment, tiles where blocks are arranged may play a role in a progress of the match-three game as well as the blocks. According to an embodiment, tiles are unmovable by a user while blocks are movable. According to an embodiment, referring to FIG. 1A, an appearance of the tile 112 affecting a progress of game may be different than an appearance of the ordinary tile 111. The tile 112 may be referred to as the special tile 112. According to an embodiment, when matched blocks are removed on the tile 112 as illustrated in FIG. 1C, the game providing apparatus 6000 may change an appearance of the tile 112 to allow users to recognize that the tile 112 affects a progress of game. Accordingly, a number of tiles whose appearances need to change may decrease by 1 as illustrated in the progress window 130 of FIG. 1D.

According to an embodiment, when matched blocks are removed from tiles including an ordinary tile 111 and a special tile 112, a graphic representation of changing an appearance of the special tile 112 may be displayed while the ordinary tile 111 may remain unchanged, but is not limited thereto.

Figure 1E:
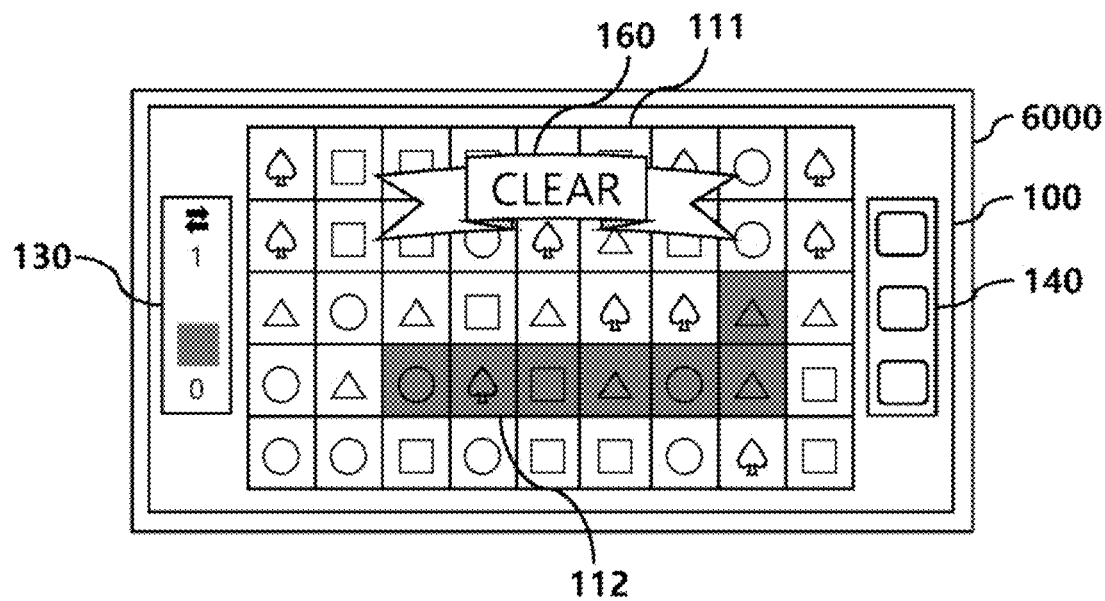

According to an embodiment, a winning requirement may be satisfied when appearances of 7 tiles change, and then, the game providing apparatus 6000 may display a message window 160 indicating that a stage is cleared as illustrated in FIG. 1E.

According to an embodiment, tiles where blocks are arranged also affect a progress of the match-three game, as well as the blocks, users may be more immersed in the game while maintaining fundamental game rules.

According to an embodiment, users may be provided with missions related to tiles where blocks are arranged, which may immerse users in the game by stimulating the competitive spirit of users.

According to an embodiment, changes of a graphic representation regarding tiles affecting the progress of the match-three game may be displayed to allow users to intuitively recognize the progress of the match-three game.

Figure 2:
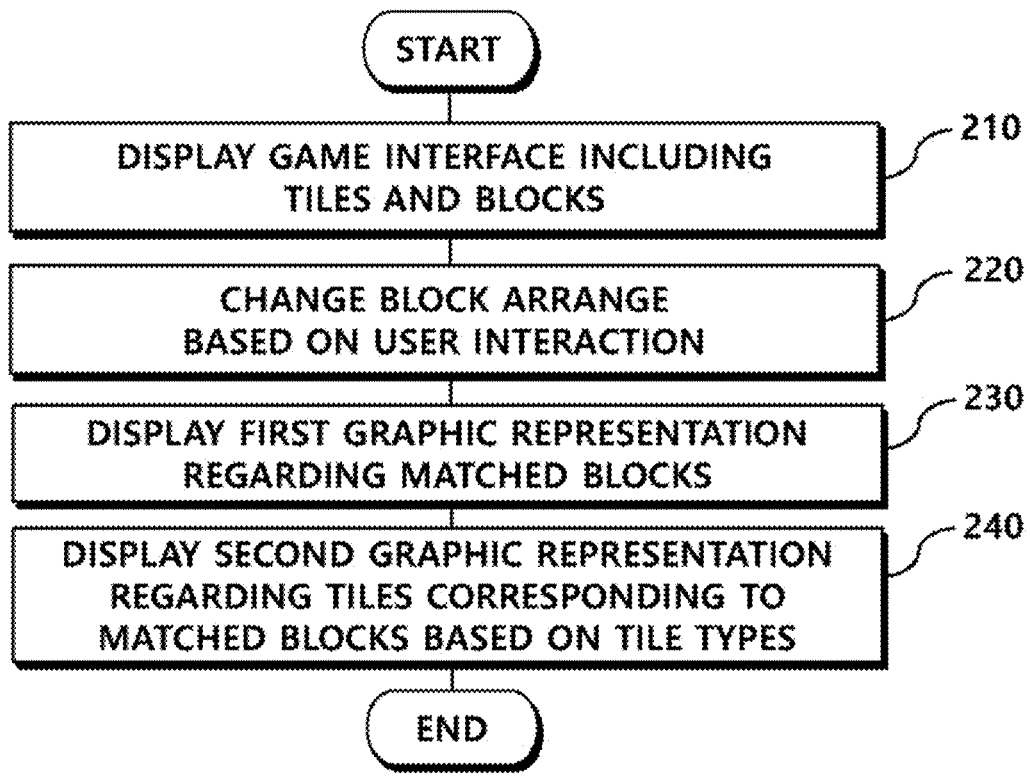
FIG. 2 is a flowchart of a game providing method according to an embodiment.

A game providing method wherein tiles are use is explained by referring to FIG. 2.

FIG. 2 is a flowchart of a game providing method according to an embodiment.

At 210, a game providing apparatus may display a game interface including a tile and a block. The block may be arranged on the tile. The tile is an element constituting a game board. The game board may include a plurality of tiles, and a plurality of blocks may be arranged on the plurality of tiles respectively.

At 220, the game providing apparatus may change a block arrangement based on a user interaction. The block arrangement may be changed when an item is used or at least three blocks satisfying a predetermined condition are identified among the plurality of blocks. According to an embodiment, the predetermined condition may be satisfied when at least three matched blocks are arranged in a line by a user switching positions between two adjacent blocks. According to an embodiment, the predetermined condition may is satisfied when four matched blocks are arranged in a rectangle shape, such as 2×2 by a user switching positions between two adjacent blocks.

At 230, the game providing apparatus may display a first graphic representation regarding the matched blocks satisfying the predetermined condition. For example, the first graphic representation may be a graphic representation of removing at least three matched blocks arranged in a line. The first graphic representation may be a graphic representation of removing the matched blocks and filling vacancies with other blocks.

At 240, the game providing apparatus may display, based on types of tiles corresponding to the matched blocks satisfying the predetermined condition, a second graphic representation regarding the tiles. The tiles corresponding to the matched blocks satisfying the predetermined condition may be tiles on which the matched blocks satisfying the predetermined condition are located. The tiles may include ordinary tiles and special tiles. According to an embodiment, the ordinary tiles may remain unchanged, and appearances of the special tiles may change, which will be explained later by referring to FIG. 3A and FIG. 3B. According to an embodiment, when a special tile included in the tiles on which the matched blocks satisfying the predetermined condition are located, an appearance of the special tile may be changed, which will be explained later by referring to FIG. 7A, FIG. 7B, FIG. 7C, and FIG. 7D.

According to an embodiment, tiles where blocks are arranged also affect a progress of the match-three game, as well as the blocks, users may be more immersed in the game while maintaining fundamental game rules.

According to an embodiment, users may be provided with missions related to tiles where blocks are arranged, which may immerse users in the game by stimulating the competitive spirit of users.

According to an embodiment, changes of a graphic representation regarding tiles affecting the progress of the match-three game may be displayed to allow users to intuitively recognize the progress of the match-three game.

Figure 3A:
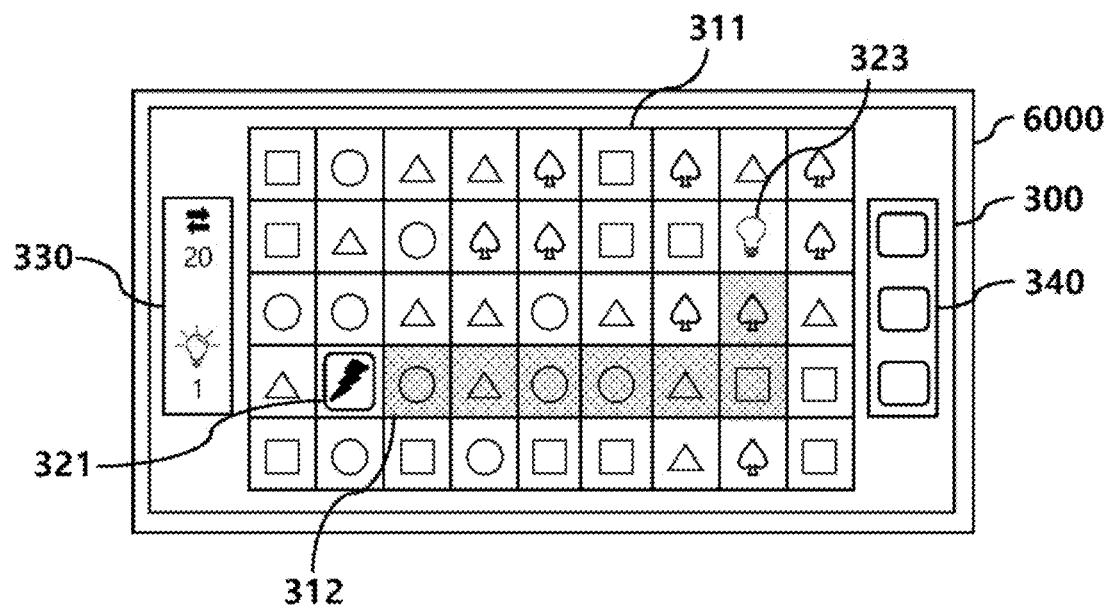
FIG. 3A and FIG. 3B illustrate game interfaces including an obstacle block according to an embodiment.
Figure 3B:
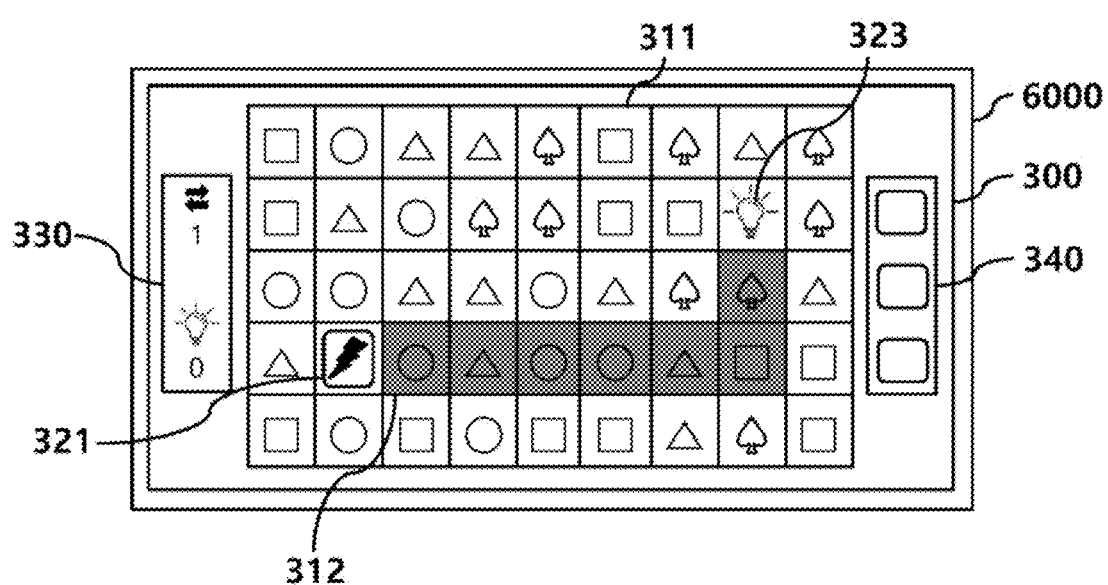

FIG. 3A and FIG. 3B illustrate game interfaces including an obstacle block according to an embodiment.

Referring to FIG. 3A, the game providing apparatus 6000 may display a game interface 300 including obstacle blocks 321 and 323. The game interface 300 may include a game board, a progress window 330 for indicating a progress state of the game, and an item window 340 for indicating special items in the game. According to an embodiment, obstacle blocks 321 and 323 are fixed on tiles, and are not able to change their positions with other blocks. The obstacle blocks 321 and 323 may include a source block 321 and a destination block 323. Referring to FIG. 3A, the source block 321 and the destination block 323 may be represented as a battery block 321 and a light bulb block 323 respectively. The battery block 321 and the light bulb block 323 may be located on ordinary tiles, such as, a tile 311, but are not limited thereto.

According to an embodiment, a winning requirement may be satisfied when appearances of all special tiles 312 between the source block 321 and the destination block 323 are changed. The special tiles 312 may be represented as an electric line. As illustrated in the progress window 130 of the game interface 100 in FIGS. 1A through 1E, from the number of special tiles whose appearances need to be changed, users may recognize that a winning requirement is satisfied when appearances of 7 tiles are changed. However, users may wonder what would justify changing appearances of special tiles. According to an embodiment, the special tiles may be represented as an electric line connecting a battery and a light bulb. Accordingly, users may intuitively understand that the winning requirement is satisfied by connecting the battery and the light bulb with the electric line which is activated by matched blocks. The progress window 330 may indicate the number of light bulbs to be turned on by a user. Referring to FIG. 3B, a winning requirement may be satisfied when appearances of 7 tiles between two obstacle blocks 321 and 323 are changed. That is, the winning requirement is satisfied when the light bulb block 323 is connected to the battery block 321 by activating 7 electric line tiles between the battery block 321 and the light bulb block 323.

According to an embodiment, changes of a graphic representation regarding tiles affecting the progress of the match-three game may be displayed to allow users to intuitively recognize the progress of the match-three game.

According to an embodiment, fixed obstacle blocks may be located adjacent to both ends of tiles affecting the progress of the match-three game to make users aware of a goal of the game.

Figure 4A:
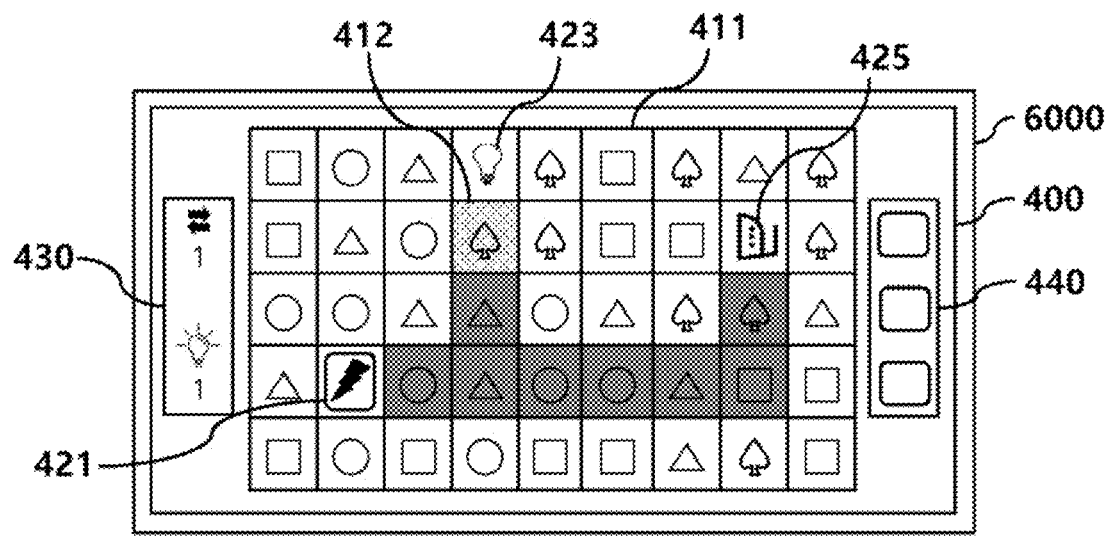
FIG. 4A, FIG. 4B, and FIG. 4C illustrate game interfaces where an obstacle block is used as an item according to an embodiment.
Figure 4B:
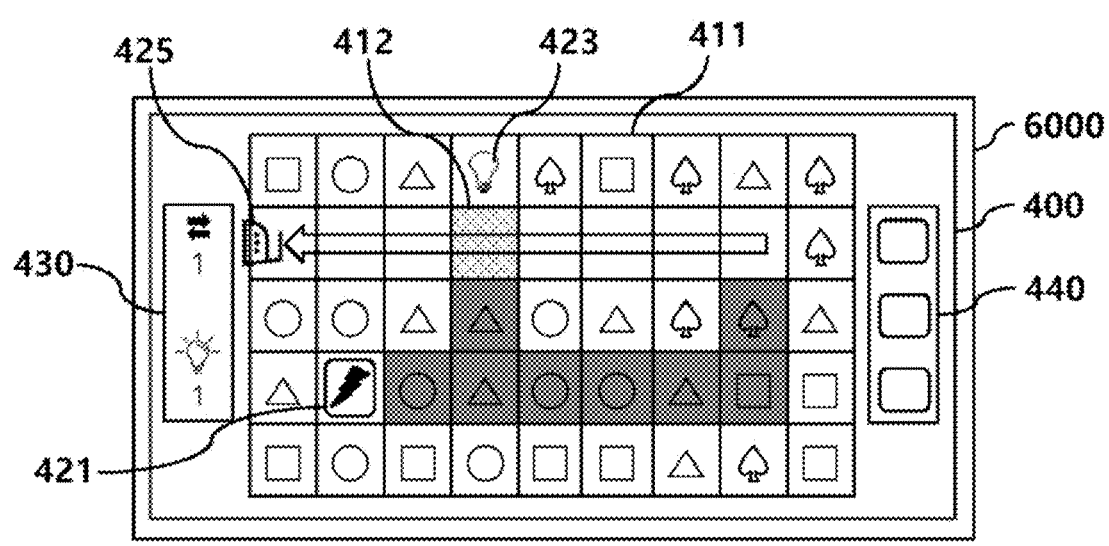
Figure 4C:
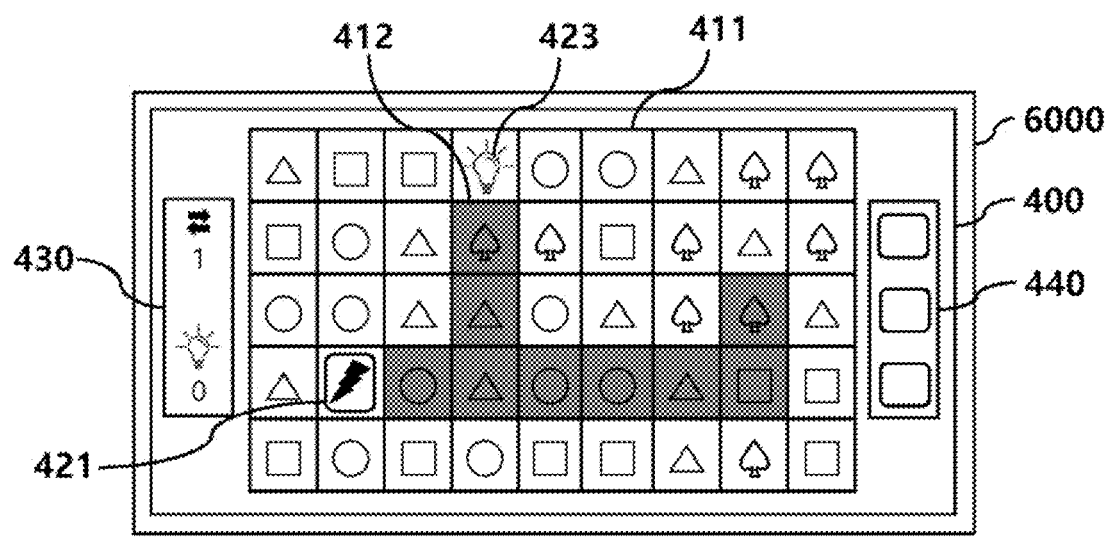

FIG. 4A, FIG. 4B and FIG. 4C illustrate game interfaces including an obstacle block used as an item according to an embodiment.

According to an embodiment, an obstacle block may be used as an item in a match-three game. Referring to FIG. 4A, a game interface 400 may include a game board, a progress window 430 for indicating a progress state of the game, and an item window 440 for indicating special items in the game. The game interface 400 may display three immobile obstacle blocks 421, 423, and 425. The obstacle blocks 421, 423, and 425 may include a source block 421 and destination blocks 423 and 425. The destination block 423 may be a light bulb block 423, which is explained above by referring to FIG. 3A and FIG. 3B. The destination block 425 may be an item block 425. When all special tiles between a battery block 421 and the item block 425 are activated, the item block 425 may be triggered. As illustrated in FIG. 4B, when appearances of all special tiles between the battery block 421 and the item block 425 are changed, the item block 425 may remove left blocks, a graphic representation resulting from the item block 425 may be displayed in the game interface 400. For example, a graphic representation of the item block 425 moving in a left direction while bursting blocks may be displayed. Referring to FIG. 4C, a winning requirement is satisfied in response to that an appearance of a special tile 412 is changed as the item block 425 removes a block located on the 412. The battery block 421 and the light bulb block 423 may be located on ordinary tiles, such as a tile 411, but are not limited thereto. The item block 425 may be located on ordinary tiles, such as the tile 411 or special tiles, such as the tile 412, but is not limited thereto.

According to an embodiment, a variety of fixed destination blocks may be located adjacent to an end of tiles affecting the progress of the match-three game to make users aware of a function of the destination blocks and the a goal of the game.

Figure 5:
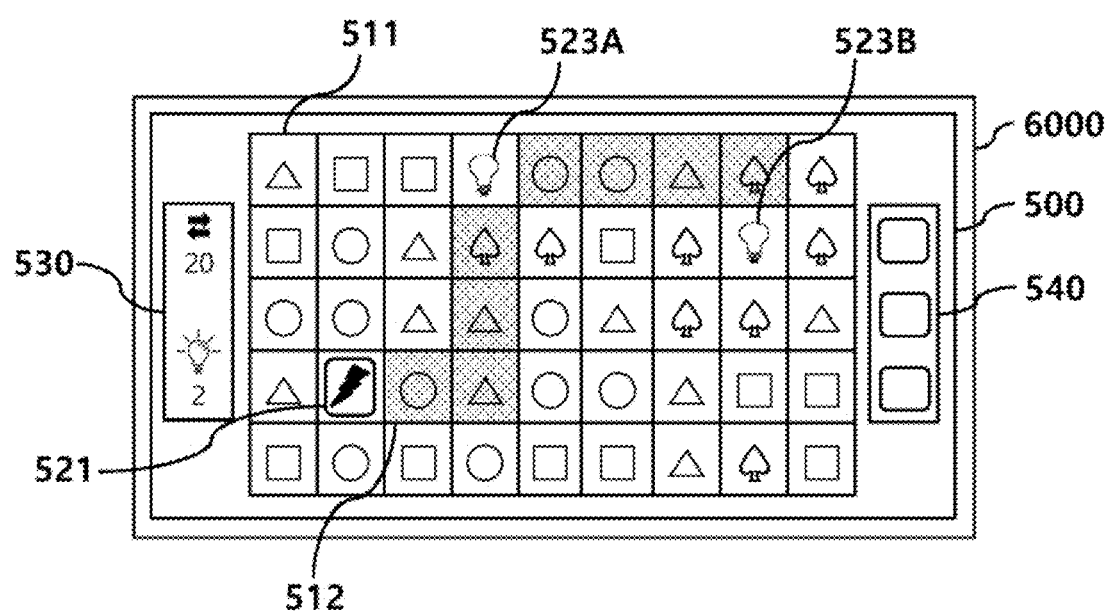
FIG. 5 illustrates a game interface including a source block and two destination blocks according to an embodiment.

FIG. 5 illustrates a game interface including a source block and two destination blocks according to an embodiment.

Referring to FIG. 5, a progress window 530 indicating a winning requirement of a user may be displayed in a game interface 500. The progress window 530 indicates a progress state of the game. The game interface 500 may further include an item window 540 for indicating special items in the game. The progress window 530 may let users aware of the number of light bulb blocks to be turned on. Referring to FIG. 5, a source block 521 and a destination block 523A may be located adjacent to both ends of four tiles, including a tile 512, of eight special tiles whose appearances need to be changed. Another destination block 523B may be located adjacent to an end of other four tiles. Accordingly, a winning requirement may be recognized visually and intuitively by users, wherein the winning requirement is satisfied in response to connecting immobile battery block 521 and two light bulb blocks 523A and 523B in serial. The battery block 521 and the light bulb blocks 523A and 523B may be located on ordinary tiles, such as a tile 511, but are not limited thereto.

Figure 6:
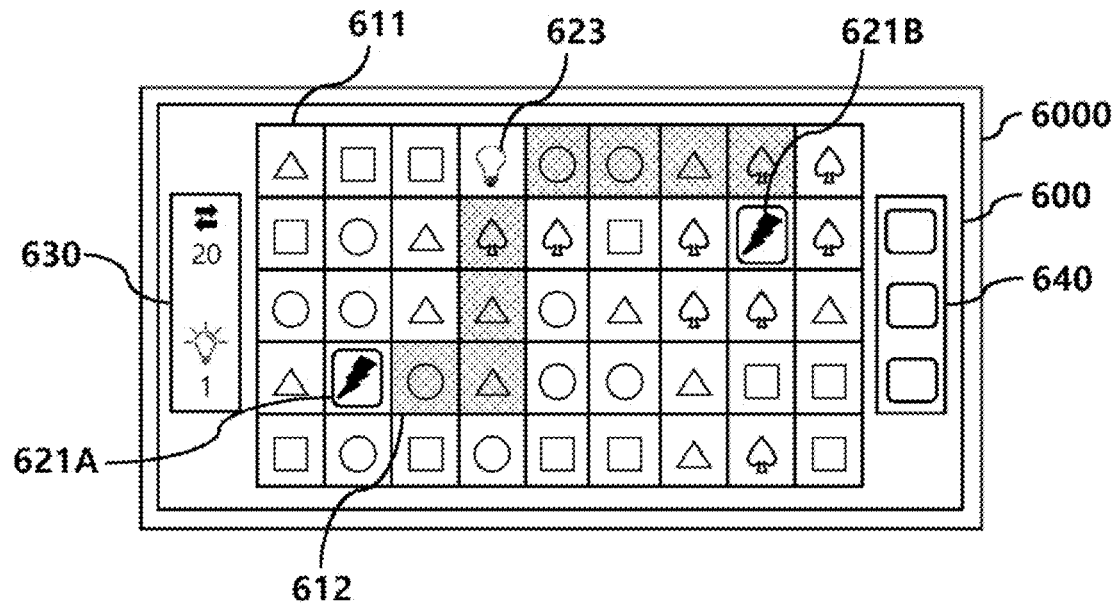
FIG. 6 illustrates a game interface including two source blocks and two destination blocks according to an embodiment.

FIG. 6 illustrates a game interface including two source blocks and two destination blocks according to an embodiment.

Referring to FIG. 6, a progress window 630 indicating a winning requirement of a user may be displayed in a game interface 600. The game interface 600 may further include an item window 640, and a game board. The progress window 630 may allow users to be aware of the number of light bulb blocks to be turned on. Referring to FIG. 6, a winning requirement of the game may be satisfied when special tiles, such as a tile 612, between a light bulb block 623 and a battery block 621A or 621B are activated. Accordingly, a winning requirement may be visually and intuitively by users, wherein the winning requirement is satisfied in response to connecting the light bulb block 623 to either one of battery block 621A and 621B. FIG. 6 illustrates that the light bulb block 623 is located between two battery blocks 621A and 621B and the light bulb block 623 may be turned on when tiles between the light bulb block 623 and the battery block 621A are activated and/or when tiles between the light bulb block 623 and the battery block 621B are activated. According to an embodiment, when a light bulb block and a battery block are located on electric line tiles constituting a closed circuit, such as, a circle, a winning requirement may be satisfied whenever tiles between the light bulb block and the battery block are activated on a left, right, upper, or lower semicircle of the circle. The battery blocks 621A and 621B and the light bulb block 623 may be located on ordinary tiles, such as a tile 611, but are not limited thereto.

FIG. 7A, FIG. 7B, FIG. 7C, and FIG. 7D illustrate game interfaces including tiles according to an embodiment.

According to an embodiment, while ordinary tiles remain unchanged, appearances of special tiles may be changed, which is explained above by referring to FIG. 3A and FIG. 3B. According to an embodiment, when a special tile included in the tiles on which the matched blocks satisfying the predetermined condition are located, an appearance of the special tile may be changed. Special tiles illustrated in FIG. 3A and FIG. 3B may be referred to as second tiles or electric line tiles. Special tiles illustrated in FIG. 7A, FIG. 7B, FIG. 7C, and FIG. 7D may be referred to as third tiles or paint tiles. Ordinary tiles may be referred to as first tiles.

Figure 7A:
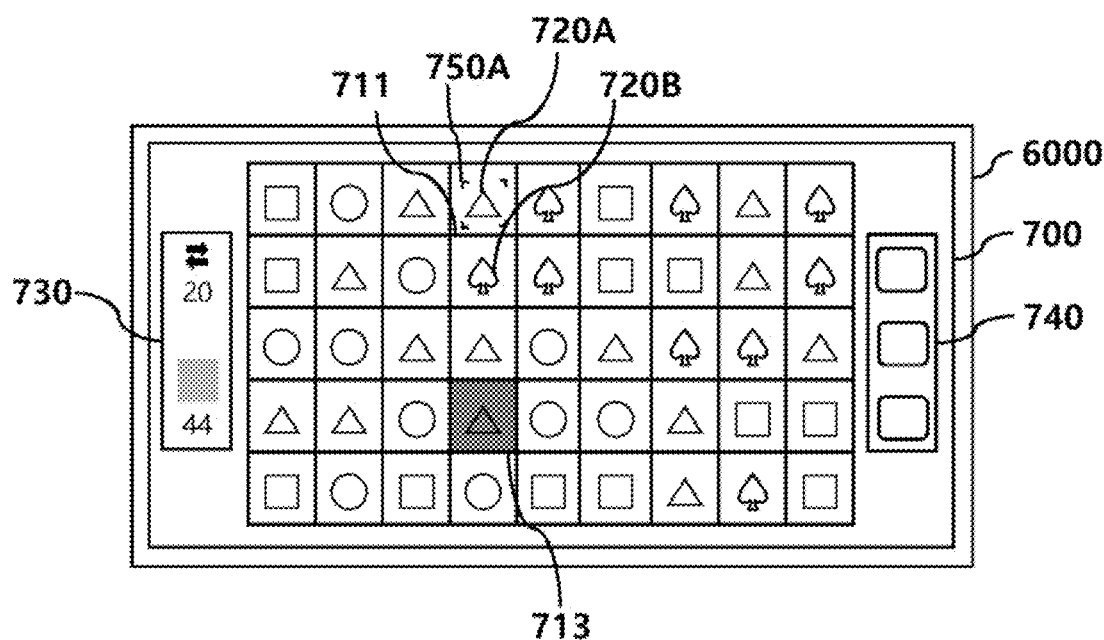
FIG. 7A, FIG. 7B, FIG. 7C, and FIG. 7D illustrate game interfaces including tiles according to an embodiment.

Referring to FIG. 7A, a game interface 700 may include a progress window 730 for indicating a progress state of the game, and an item window 740 for indicating special items in the game. The progress window 730 may indicate the number of tiles whose appearance need to be changed by a user. The game interface 700 may include a game board with a size of 9×5, and the game board may consist of 45 tiles. Referring to FIG. 7A, one tile 713 has different an appearance than others, and a winning requirement may be visually and intuitively recognized by users, wherein the winning requirement is satisfied in response to changing all appearances of other tiles along the tile.

Figure 7B:
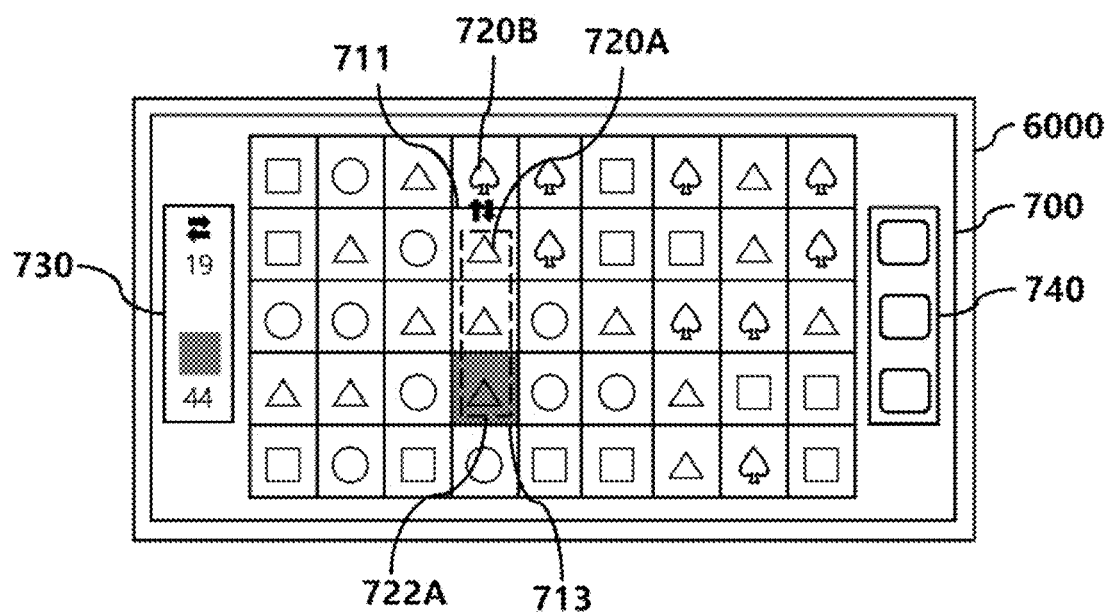
Figure 7C:
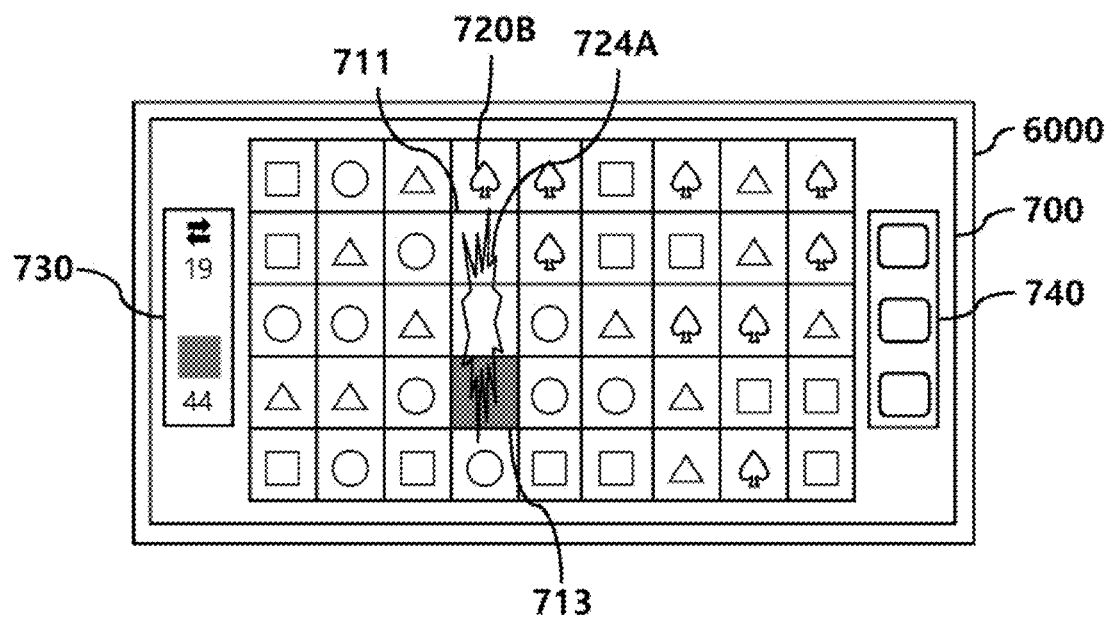

As a position of a selected block 720A (surrounded by an indicator 750A) a is switched with a position of an adjacent block 720B as illustrated in FIG. 7A, matched blocks 722A are arranged in a line as illustrated in FIG. 7B. The game providing apparatus 6000 may display a graphic representation 724A of removing the three matched blocks 722A as illustrated in FIG. 7C. Blocks 726A located above the three matched blocks may fill vacancies as illustrated in FIG. 7D after the three matched blocks 722A are removed.

Figure 7D:
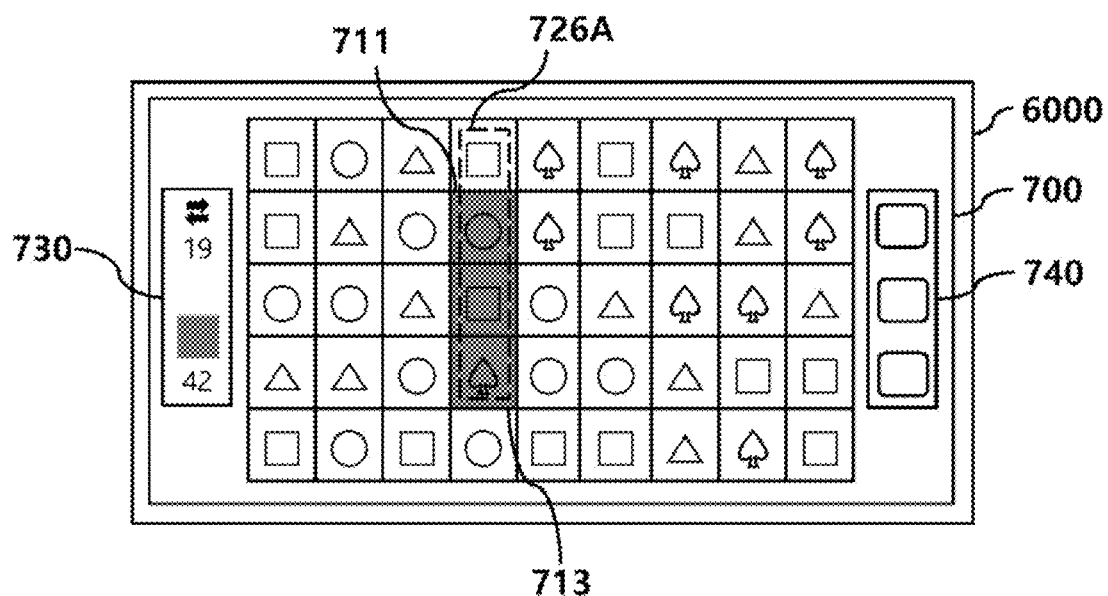

According to an embodiment, referring to FIG. 7B, when the special tile 713 is included in tiles on which the matched blocks 722A are arranged and the matched blocks 722A are removed, appearances of ordinary tiles 711 included in the tiles on which the matched blocks 722A are located are changed as illustrated in FIG. 7D. Appearances of ordinary tiles 711 may become the same with the special tile 713, which may make users intuitively and visually aware of a winning requirement of the game. After appearances of ordinary tiles 711 become the same with the special tile 713, these ordinary tiles may function as the special tile 713 to spread paint to adjacent tiles.

According to an embodiment, tiles where blocks are arranged may play a role in a progress of the match-three game as well as the blocks, and graphic representations regarding the tiles may allow users to intuitively recognize rules related to the tiles.

Figure 8A:
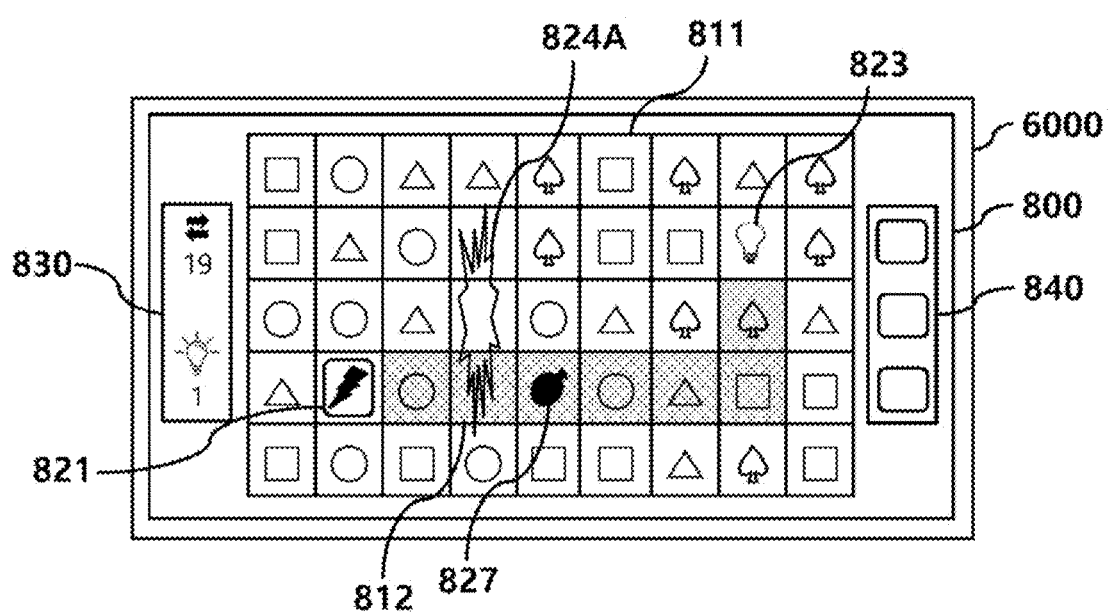
FIG. 8A, FIG. 8B, and FIG. 8C illustrate game interfaces where an obstacle block is removed according to an embodiment.
Figure 8B:
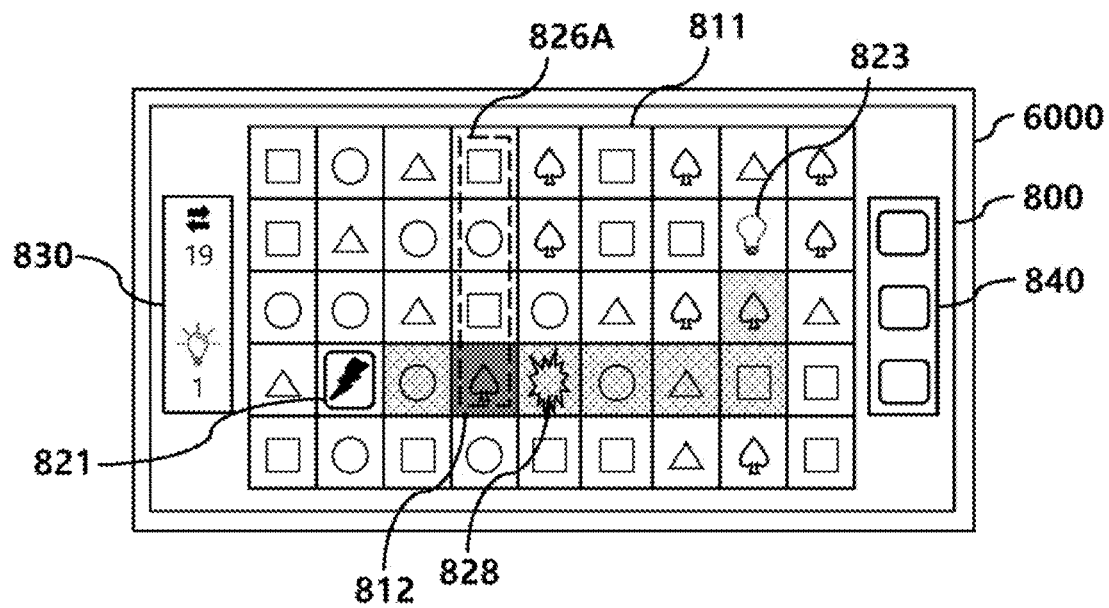
Figure 8C:
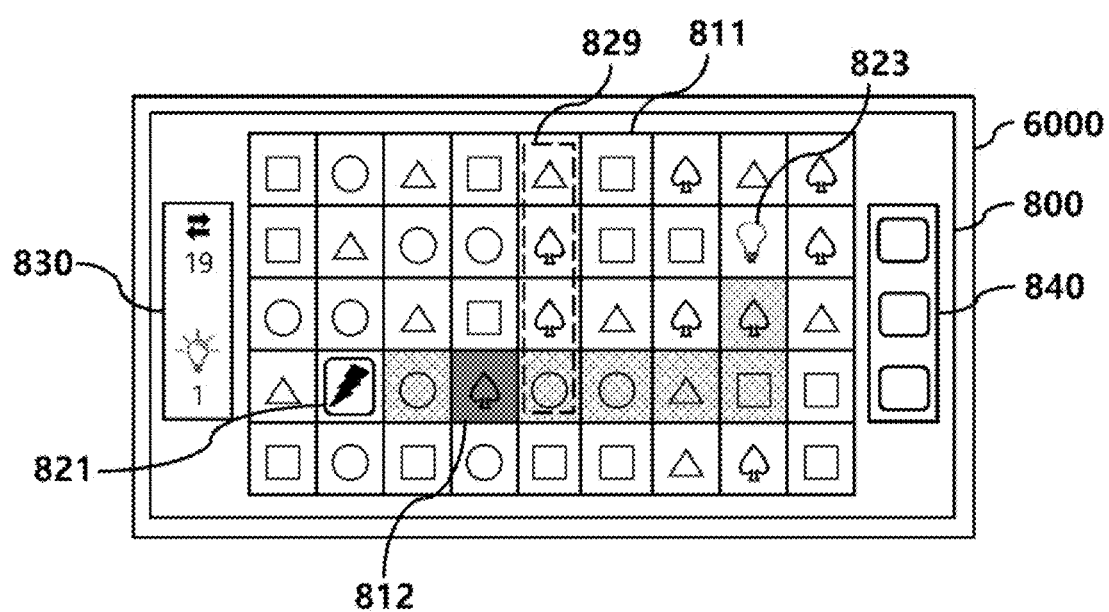

FIG. 8A, FIG. 8B, and FIG. 8C illustrate game interfaces where an obstacle block is removed according to an embodiment.

A game interface 800 may include a game board, a progress window 830, and an item window 840. According to an embodiment, an obstacle block 827 may be fixed on the game board and not movable by a user, but may be removed when a predetermined condition is satisfied. Referring to FIG. 8A, the predetermined condition may be satisfied when the obstacle block 827 is next to matched and removed blocks. According to the progress window 830, a winning requirement is turning on one light bulb block 823 within 19 moves. The light bulb block 823 may be turned on by activating special tiles including a tile 812 between the light bulb block 823 and a battery block 821. Activated special tiles may look different from unactivated special tiles.

As shown as a graphic representation 824A in FIG. 8A, when matched blocks are removed close to the obstacle block 827, blocks 826A above the matched and removed blocks move down to fill up vacancies. Furthermore, the obstacle block 827 may be removed together with the matched blocks, and a graphic representation 828 of removing the obstacle block 827 may be displayed in the game interface 800 as illustrated in FIG. 8B.

A tile on which the obstacle block 827 was located is vacated in response to removal of the obstacle block 827, and then blocks 829 located above the obstacle 827 may move down to fill an empty tile as illustrated in FIG. 8C. The tile on which the obstacle block 827 was located is a special tile, that is, an electric line tile which may be activated when matched blocks are removed on this tile.

According to an embodiment, the obstacle block 827 may be represented as a water balloon to show that the obstacle block 827 will be burst together when matched blocks are burst nearby. The water balloon block 827 may be located on an ordinary tile, such as a tile 811, and a special tile, such as the tile 812, but are not limited thereto.

Figure 9A:
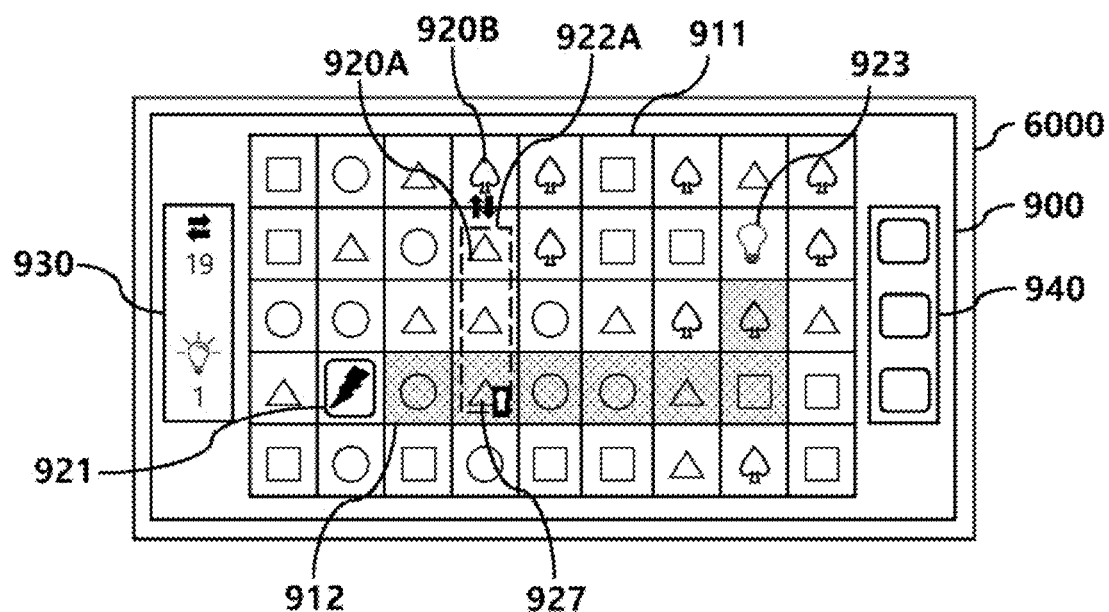
FIG. 9A and FIG. 9B illustrate game interfaces including a locked block according to an embodiment.
Figure 9B:
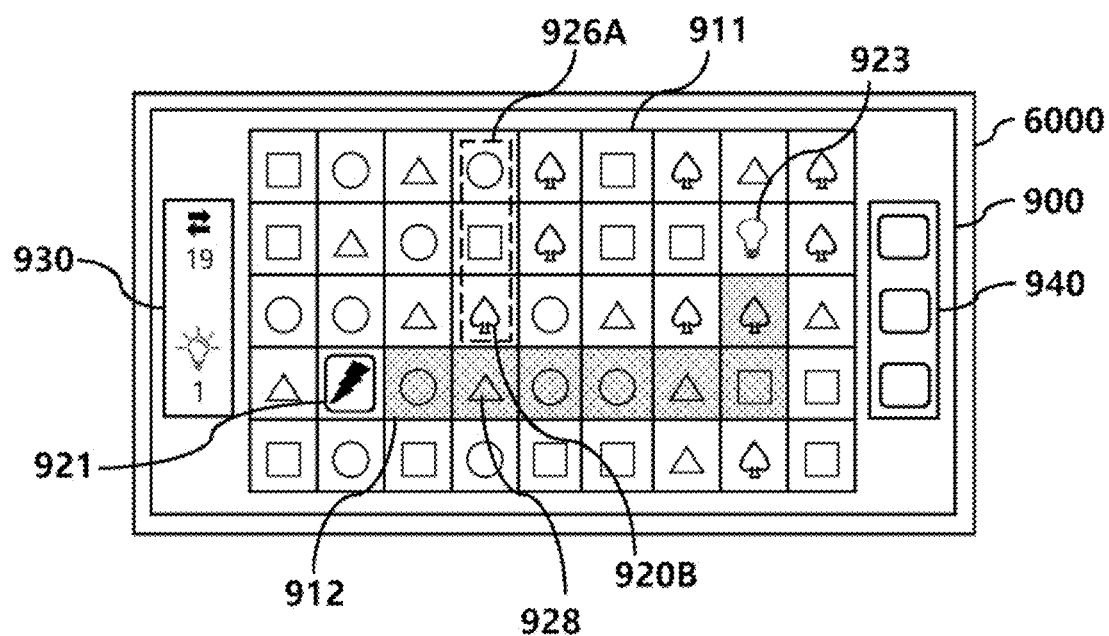

FIG. 9A and FIG. 9B illustrate game interfaces including a locked block according to an embodiment.

A game interface 900 may include a game board, a progress window 930, and an item window 940. According to the progress window 930, a winning requirement is turning on one light bulb block 923 within 19 moves. The light bulb block 923 may be turned on by activating special tiles including a tile 912 between the light bulb block 923 and a battery block 921. Activated special tiles may look different from unactivated special tiles. According to an embodiment, a locked block 927 may be fixed on the game board and not movable by a user, but may become movable when a predetermined condition is satisfied. Referring to FIG. 9A, the predetermined condition may be satisfied when the locked block 927 is included in three matched blocks 922A arranged in a line. The three matched blocks 922A are arranged in a line by switching positions between blocks 920A and 920B. Referring to FIG. 9B, the locked block 927 of the matched blocks may become unlocked and other two blocks of the matched blocks may be removed when the predetermined condition is satisfied. As illustrated in FIG. 9B, blocks 926A located above the matched blocks may fill two empty tiles where the two blocks were removed. A tile on which the unlocked block 928 is located is a special tile, that is, an electric line tile which may be activated when the unlocked block 928 is removed from this tile.

According to an embodiment, the locked block 927 may be represented as having a similar appearance to other ordinary blocks, which may make users understand that the locked block 927 may be also matched with other blocks. The locked block 927 may be located on an ordinary tile, such as a tile 911, and a special tile, such as the tile 912.

Figure 10A:
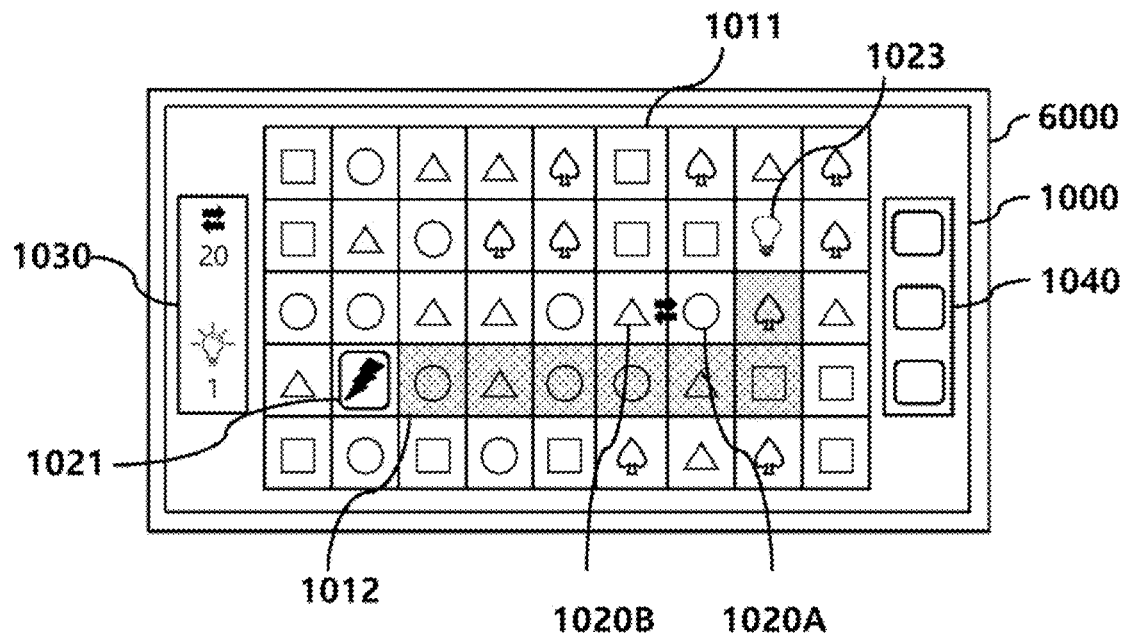
FIG. 10A, FIG. 10B, and FIG. 10C illustrate game interfaces where blocks arranged in a rectangle are removed according to an embodiment.
Figure 10B:
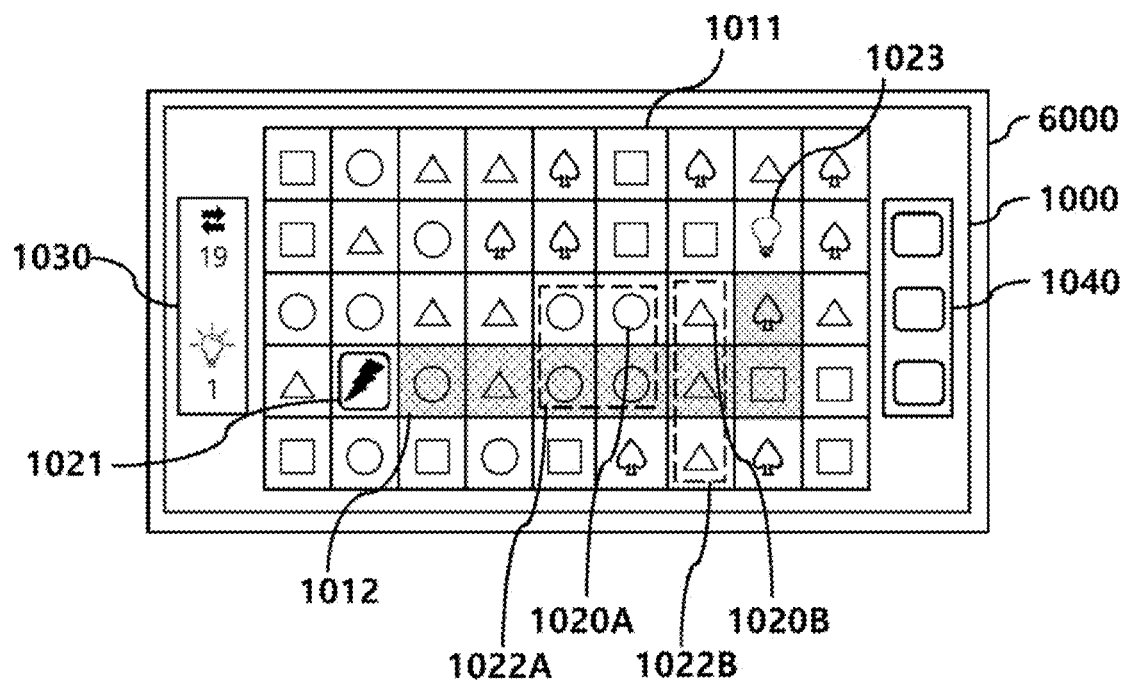
Figure 10C:
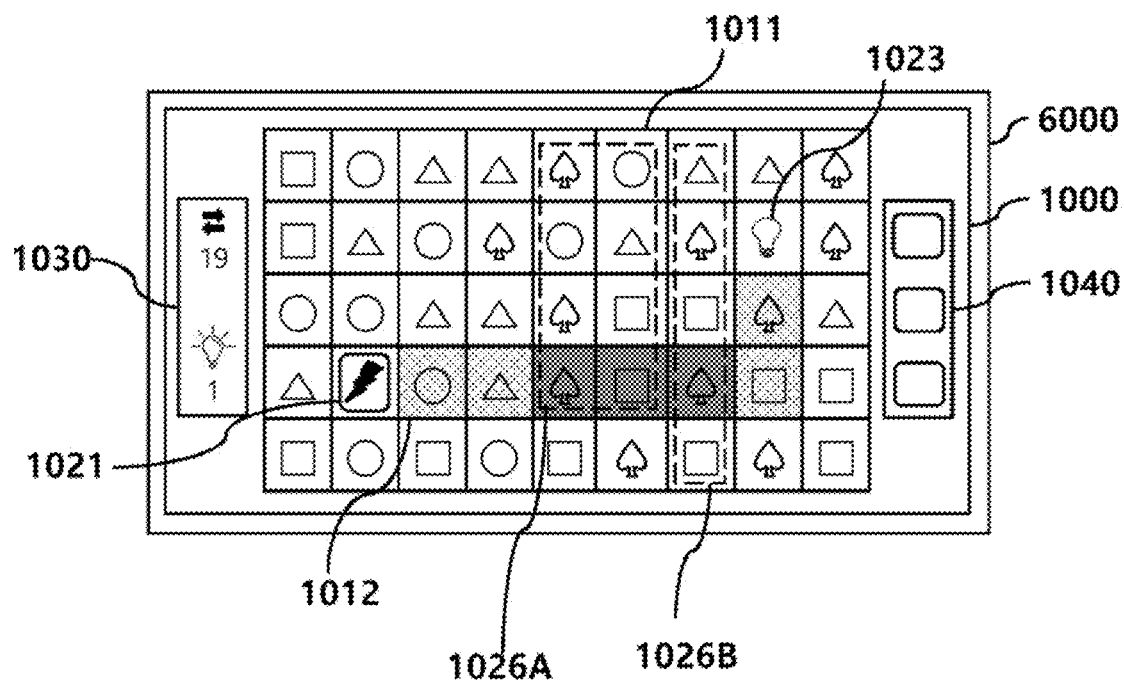

FIG. 10A, FIG. 10B, and FIG. 10C illustrate game interfaces where blocks arranged in a rectangle are removed according to an embodiment.

A game interface 1000 may include a game board, a progress window 1030 and an item window 140. According to the progress window 1030, a winning requirement is turning on one light bulb block 1023 within 20 moves. The light bulb block 1023 may be turned on by activating special tiles including a tile 1012 between the light bulb block 1023 and a battery block 1021. Activated special tiles may look different from unactivated special tiles. The special tiles may look different from ordinary tiles, such as a tile 1011. According to an embodiment, when a plurality of block groups identifying a predetermined condition are identified, a graphic representation of removing the plurality of block groups and replacing the plurality of block groups with other blocks.

Referring to FIG. 10A, when two blocks 1020A and 1020B change their positions, two block groups 1022A and 1022B may be identified by the game providing apparatus 6000 as satisfying the predetermined condition. According to an embodiment, the predetermined condition may be satisfied when at least three matched blocks are arranged in a line like a block group 1022B as illustrated in FIG. 10B. According to an embodiment, the predetermined condition may be satisfied when four matched blocks are arranged in a rectangular shape like a block group 1022A as illustrated in FIG. 10B. Referring to FIG. 10C, the block group 1022A having four matched blocks arranged in a rectangular shape, and the block group 1022B having the at least three matched blocks may be removed from the game interface 1000. The plurality of block groups 1022A and 1022B may be removed simultaneously. According to an embodiment, more matched blocks are identified as a block arrangement changes, identified matched blocks may be removed.

After the block groups 1022A and 1022B satisfying the predetermined condition are removed, block groups 1026A and 1026B which was located above the matched and removed block groups 1022A and 1022B may move down to fill empty tiles.

According to an embodiment, variety of matching condition may make the match-three game more enjoyable.

Figure 11:
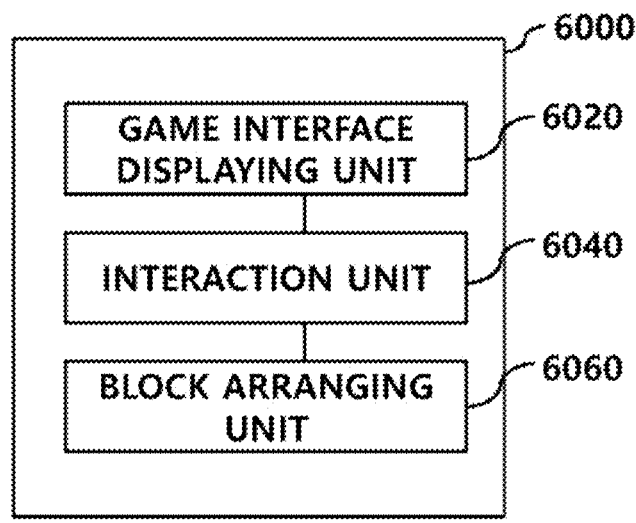
FIG. 11 is a block diagram of a game providing apparatus according to an embodiment.

FIG. 11 is a block diagram of a game providing apparatus according to an embodiment.

Referring to FIG. 11, the game providing apparatus may include a game interface displaying unit 6020, an interaction unit 6040, and a block arranging unit 6060.

The game interface displaying unit 6020 may display a game interface and related graphic representations. Functionality of the game interface displaying unit 6020 is substantially same with operations explained above, for example, by referring to 210, 230, and 240 of FIG. 2.

The interaction unit 6040 may detect an input of a user playing a match-three game, the block arranging unit 6060 may change an arrangement of blocks based on the detected input. Functionality of the interaction unit 6040 and the block arranging unit 6060 is substantially same with operations explained above, for example, by referring to 220 of FIG. 2.

The game providing apparatus 6000 may be a terminal, but is not limited thereto. For example, the game providing apparatus 6000 may be a server, or a system including the server and the terminal. Functionality of the game providing apparatus 6000 may be performed at the terminal and the server. Some functionality may be performed at the terminal, and other functionality may be performed at the server. Each component of the game providing apparatus 6000 may be implemented by interaction between a plurality of devices, such as the server and the terminal. Sub-components of each component may be implemented by interaction between the server and the terminal.

Figure 12:
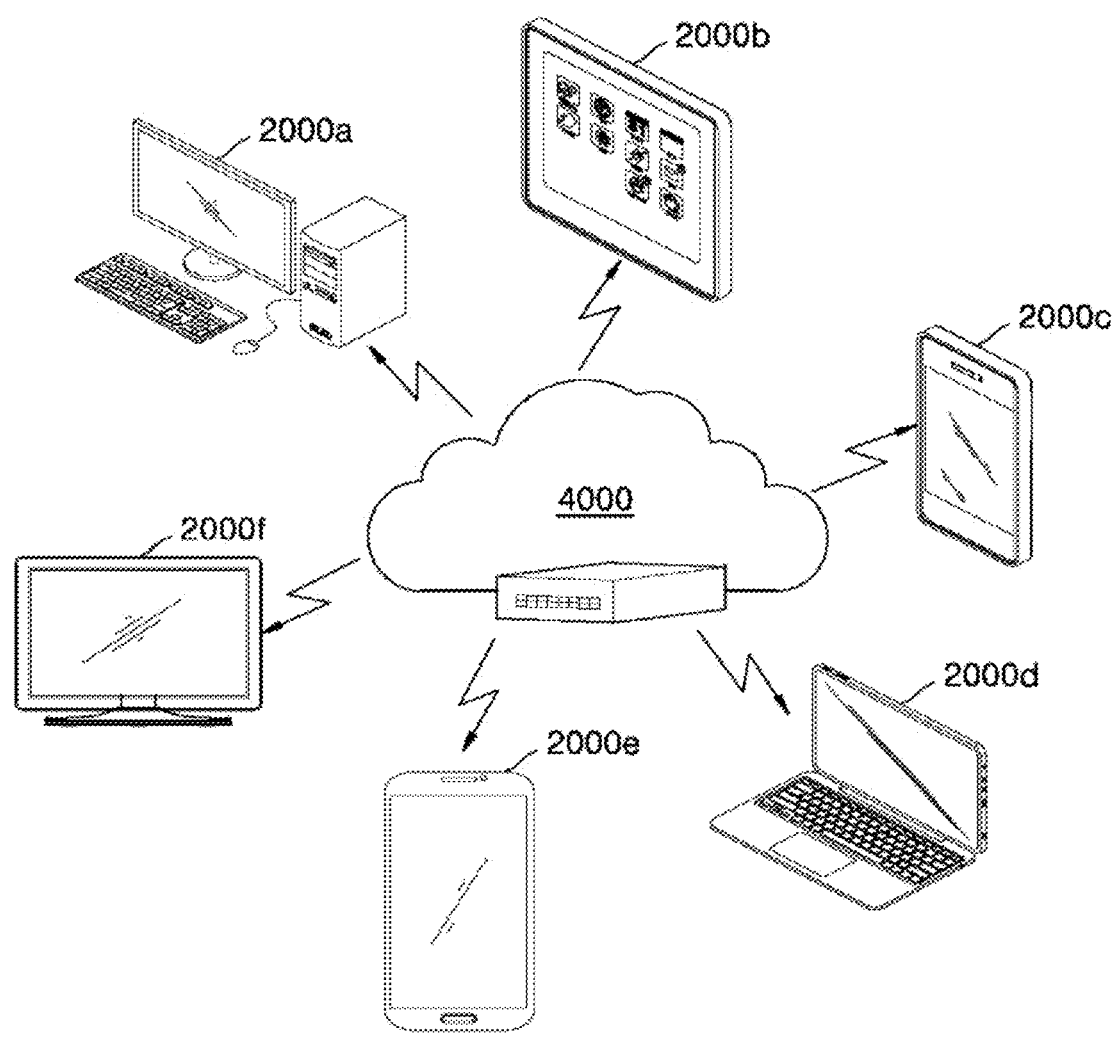
FIG. 12 illustrates an online game providing system including a server and a terminal according to an embodiment.

FIG. 12 illustrates an online game providing system including a server and a terminal according to an embodiment.

The online game provision system according to an embodiment may include a server 4000 and a plurality of terminals 2000*a*, 2000*b*, 2000*c*, 2000*d*, 2000*e*, and 2000*f* as shown in FIG. 12. The server 4000 may provide an online game to the plurality of terminals 2000*a*, 2000*b*, 2000*c*, 2000*d*, 2000*e*, and 2000*f* by servicing online games through the network.

FIG. 12 shows, as examples of terminals used by a user, a desktop computer 2000*a*, a tablet 2000*b*, a mobile phone 2000*c*, a laptop 2000*d*, a smartphone 2000*e*, and a television 2000*f*, but are not limited thereto. The terminals may include various electronic devices such as a personal digital assistant (PDA), a portable multimedia player (PMP), a navigation device, an MP3 player, a digital camera, a refrigerator, a washing machine and a vacuum cleaner.

According to an embodiment, the server 4000 may be operated by a game provider, and server 4000 may include, but is not limited to, a single server, a collection of servers, and a cloud server. The server 4000 may provide online games to users, and may include a database for storing data of the users. The server 4000 may include a transaction server for generating and processing transactions.

According to an embodiment, a network may refer to connections established (or configured) using any communication means. The network may be established between terminals 2000*a*, 2000*b*, 2000*c*, 2000*d*, 2000*e* and 2000*f*. The network may be established between terminals 2000*a*, 2000*b*, 2000*c*, 2000*d*, 2000*e*, and 2000*f* and the server 4000.

The communication means may be used with a certain communication standard, a certain frequency band, a certain protocol, and/or a certain channel. The communication means includes means using a short distance communication, a long distance communication, a wireless communication, and/or a wired communication, but is not limited thereto. For example, the communication means may include, but is not limited to, the Internet, wireless fidelity (Wi-Fi), Bluetooth, Bluetooth Low Energy (BLE), Near Field Communication (NFC), Zigbee, 3G, 4G, Long-Term Evolution (LTE), 5G.

The short distance communication means may allow devices within a short range to communicate with each other. The short distance communication means may include, but is not limited to, Bluetooth, BLE, NFC, and Zigbee.

The long distance communication means may allow devices to communicate with each other regardless of distances between them. For example, the long distance communication means may, but is not limited thereto, comprise a means communicating through a repeater, such as an access point (AP), and/or a means communicating through a cellular network (3G, 4G, LTE, 5G, etc.).

Communication between the server 4000 and the terminals 2000a, 2000b, 2000c, 2000d, 2000e, and 2000f may be performed through any communication means while the server 4000 serving the online game through the network.

An online game may include a match-three game, role playing game (RPG), a tabletop RPG (TRPG), a massively multiplayer online RPG (MMORPG), a multiplayer online battle arena (MOBA) game, an Aeon of Strife (AOS) game, a real time strategy (RTS) game, a first person shooter (FPS) game, a trading card game (TCG), a collectible card game (CCG), a sports game, a fighting game, a puzzle game, a shooting game, etc., but is not limited thereto. A competition between users or a competition between a user and a computer (e.g., artificial intelligence) may occur in the online game. The online game may be implemented in various forms.

Figure 13:
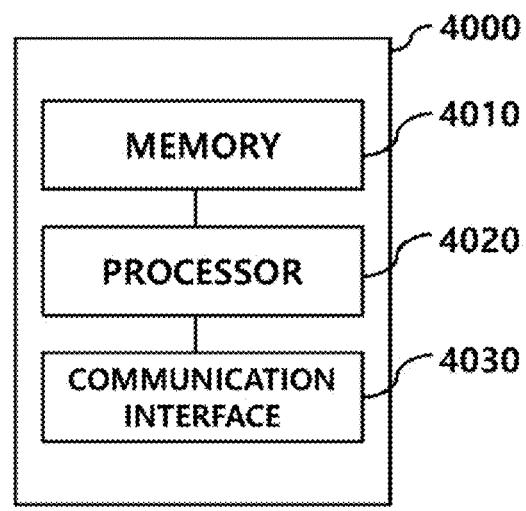
FIG. 13 is a block diagram of a server according to an embodiment.

FIG. 13 is a block diagram of a server according to an embodiment.

As shown in FIG. 13, the server 4000 may include a memory 4010, a processor 4020, and a communication interface 4030. However, all the components shown in FIG. 13 should not be regarded as essential components of the server 4000. The server 4000 may be implemented by more or fewer components than the components shown in FIG. 13.

The memory 4010 may store programs and instructions for processing and controlling of the processor 4020, and store data inputted to or outputted from the server 4000.

The memory 4010 may store instructions that enable the server 4000 to perform various operations in accordance with embodiments herein. The memory 4010 may store information necessary for service of an online game. For example, the memory 4010 may store information about accounts, characters, and items of users, but is not limited thereto, may store a variety type of information.

The memory 4010 may include at least one from among a flash memory type memory, a hard disk type memory, a multimedia card micro type memory, a card type memory (e.g., a secure digital (SD) memory, an extreme digital (XD) memory, etc.), a random access memory (RAM), a static RAM (SRAM), a read-only memory (ROM), a programmable ROM (PROM), an electrically erasable PROM (EEPROM), a magnetic memory, a magnetic disk, and an optical disc. Programs stored in the memory 4010 may be classified into a plurality of modules.

The processor 4020 may generally control the overall operation of the server 4000. For example, the processor 4020 may execute programs stored in the memory 4010 to control components included in the server 4000. The processor 4020 may include multiple processors, such as one or more central processing units (CPUs), one or more graphics processing units (GPUs), and/or combinations thereof.

The processor 4020 may be configured to execute instructions stored in memory 4010 to cause the server 4000 to perform various operations in accordance with various embodiments herein.

The communication interface 4030 may be an electronic circuit designed to communicate with other devices with conforming to a certain standard.

The communication interface 1510 may include a Bluetooth communication interface, a Bluetooth low energy (BLE) communication interface, a near field communication (NFC) interface, a wireless fidelity (Wi-Fi) communication interface, a ZigBee communication interface, an infrared data association (IrDA) communication interface, a Wi-Fi direct (WFD) communication interface, a ultra wideband (UWB) communication interface, an Ant+ communication interface, a Z-wave communication interface, a 3G communication interface, a 4G/LTE communication interface, and a 5G communication interface, but is not limited thereto.

Delivery of information in accordance with various embodiments herein may be performed through the communication interface 4030. Operators of the online game may connect to the server 4000 using an additional device. The operators may use a program for communicating with the server 4000. For example, the operators may communicate with the server 4000 through a web browser, and the server 4000 may request the operators to authenticate their identities.

Figure 14:
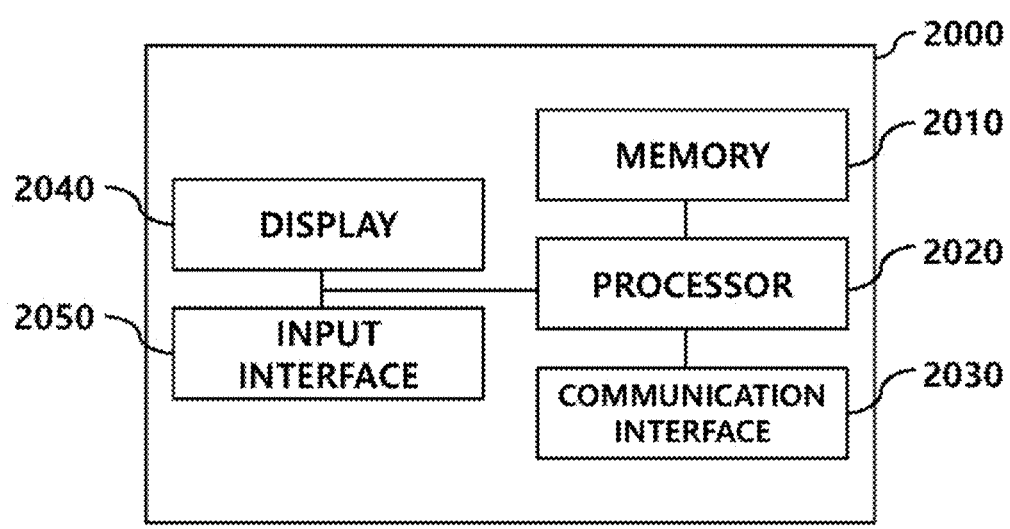
FIG. 14 is a block diagram of a terminal according to an embodiment.

FIG. 14 is a block diagram of a terminal according to an embodiment.

As shown in FIG. 14, the terminal 2000 may include a memory 2010, a processor 2040, a communication interface 2050, and a display 2040, and an input interface 2050. However, all the components shown in FIG. 14 should not be regarded as essential components of the terminal 2000. The terminal 2000 may be implemented by more or fewer components than the components shown in FIG. 14.

Explanation of the memory 2010, the processor 2020 and the communication interface 2030 of the terminal 2000 may refer to the above explanation of the memory 4010, the processor 4020, and the communication interface 4030.

The memory 2010 may store instructions that enable the terminal 2000 to perform various operations in accordance with embodiments herein. In an embodiment, the memory 2010 may store a game and data related thereto.

The processor 2020 may be configured to execute instructions stored in memory 2010 to cause the terminal 2000 to perform various operations in accordance with various embodiments herein. In an embodiment, the processor 2020 may execute the game stored in the memory 2010, and may retrieve data related to the game.

Delivery of information in accordance with various embodiments herein may be performed through the communication interface 2030.

The display 2040 is a component that visualizes information processed by the processor 2020. The information displayed by the processor 2020 may be visualized on the display 2040. The display 2040 may include at least one from among a liquid crystal display, a thin-film transistor-liquid crystal display, an organic light-emitting diode, a flexible display, a 3D display, and an electrophoretic display. The display may also function as an input interface 2050 when the display and the touchpad are integrated together to form a touch screen, The input interface 2050 is a component designed to allow a user using the terminal 2000 to interact with the terminal 2000. For example, the input interface 2050 may be a key pad, a dome switch, a touch pad (e.g., contact electrostatic capacitive type, pressure resistive film type, infrared detection type, surface acoustic wave propagation type, integral strain gauge type, piezo-effect type, etc.), a jog wheel, or a jog switch, but is not limited thereto.

The apparatus described above may be implemented as a hardware component, a software component, and/or a combination of hardware components and software components. For example, apparatuses, devices, and components described herein may be implemented using a processor, a controller, an arithmetic logic unit (ALU), a digital signal processor, a microcomputer, a field programmable gate array (FPGA), a programmable logic unit (PLU), a microprocessor, a general purpose computer, a special purpose computer system, or any other device capable of executing instructions. A processing device, such as a processor, may execute an operating system (OS) and one or more software applications running on the OS. The processing device may also access, store, manipulate, process, and generate data in response to execution of the software. For ease of understanding, the processing device is described as singular, but those skilled in the art may recognize that the processing device may include a plurality of processing elements and/or a plurality of types of processing elements. For example, the processing device may include a plurality of processors or one or more processors and one or more controllers. The processing device may have other processing configurations, such as a parallel processor.

Software may include a computer program, a code, an instruction, or a combination thereof, and may be configured to configure the processing device and/or command the processing device independently or collectively. Software and/or data may be embodied in a machine, a component, a physical device, virtual equipment, a computer storage media or device, a transmitted signal wave permanently or temporarily, in order to be interpreted by the processing device or to provide the processing device with instructions or data. Software and/or data may be distributed over a networked computer system and stored or executed in a distributed manner. Software and/or data may be stored on one or more computer readable recording media configured for execution by one or more processors. The one or more computer readable recording media may be included in a computer program product. Software and/or data may be stored in a computer program product configured for execution by one or more processors.

The method according to an embodiment may be implemented in a form of program instructions that can be executed by various computing devices, and recorded in a computer readable medium. The computer readable medium may include program instructions, data files, data structures, or a combination thereof. The program instructions recorded on the medium may be specially designed and constructed for embodiments. Examples of the computer readable media include magnetic media such as hard disks, floppy disks and magnetic tapes; optical media such as CD-ROMs and DVDs; magneto-optical media such as floptical disks, and hardware devices such as ROM, RAM, flash memory, and the like which are specifically configured to store instructions. Examples of the program instructions may include machine language codes produced by a compiler, and high-level programming language code that can be executed by a computer using an interpreter or the like. The hardware devices described above may be configured to operate by one or more software modules to perform operations of embodiments, and vice versa.

While embodiments are explained with reference to exemplary embodiments and accompanying drawings, those who skilled in the art may modify and change the embodiments from the disclosure. For example, the techniques described may be performed in a different order than the described methods, and/or the described systems, structures, devices, circuits, or any components may be integrated or combined in a different form than the described methods, or may be replaced by their equivalents, in order to achieve substantially same or similar results.

Therefore, other implementations, other embodiments, and equivalents to following claims are also within the scope the claims.

What is claimed is:

1. A game providing method, comprising:
   displaying, on a display, a game interface comprising a plurality of tiles and a plurality of blocks respectively arranged on the plurality of tiles, wherein:
      the plurality of blocks includes at least two obstacle blocks which are unmovable and not allowed to exchange their position with other blocks, and the obstacle blocks comprise a source block and a destination block; and
      the plurality of tiles comprises ordinary tiles and special tiles, the special tiles being connected to each other from the source block to the destination block;
   receiving, along an input interface, a user interaction;
   changing, on the display, an arrangement of the plurality of blocks based on the user interaction;
   identifying, by one or more processors, at least three blocks of the plurality of blocks which satisfy a predetermined condition based on the arrangement;
   displaying, on the display, a first graphic representation regarding the at least three blocks; and
   displaying, on the display, a second graphic representation regarding at least three tiles respectively corresponding to the at least three blocks, wherein
   the second graphic representation comprises a graphic representation of changing an appearance of a second tile of the at least three tiles while a first tile of the at least three tiles remain unchanged, the second tile of the at least three tiles being one of the special tiles;
   and,
   determining, by the one or more processors, if a requirement is satisfied based on whether the appearances of all the blocks special tiles are changed.

2. The game providing method of claim 1, wherein
   the plurality of tiles may be fixed, and
   at least some of the plurality of blocks are movable based on the user interaction.

3. The game providing method of claim 1,
   wherein the first graphic representation comprises a graphic representation of:
   removing the at least three blocks from the game interface and the corresponding tiles; and
   replacing the corresponding tiles of the at least three blocks with at least three other blocks.

4. The game providing method of claim 3, wherein the at least three other blocks are generated by at least one of randomly or a predetermined algorithm.

5. The game providing method of claim 1, wherein
   the at least three blocks are respectively arranged on the at least three tiles.

6. The game providing method of claim 1, wherein
   the first graphic representation comprises a graphic representation of removing a line of blocks starting from at least one of the source block and the destination block based on whether appearances of all the second tiles between the source block and the destination block are changed.

7. The game providing method of claim 1, wherein
   the plurality of blocks may include a fixed block, and
   the method further comprises displaying a third graphic representation regarding the fixed block when the identified at least three blocks are adjacent to the fixed block.

8. The game providing method of claim 7, wherein
the third graphic representation comprises a graphic representation of removing the fixed block from the game interface and replacing the fixed block with a movable block.

9. The game providing method of claim 1, wherein
the plurality of blocks may include a locked block of which movement is locked, and
when the locked block is included in the at least three blocks which satisfy the predetermined condition, the first graphic representation comprises a graphic representation of unlocking the locked block such that the unlocked block is movable.

10. The game providing method of claim 1, wherein
the changing the arrangement of the plurality of blocks comprises changing the arrangement of the plurality of blocks by exchanging a position of one block selected by the user interaction with a position of an adjacent block.

11. The game providing method of claim 1, wherein
the predetermined condition comprises a condition where the at least three blocks have identical appearances and are arranged in a line.

12. The game providing method of claim 1, wherein
the predetermined condition comprises a condition where the at least three blocks have identical appearances and are arranged in a rectangle.

13. The game providing method of claim 1, wherein
the identifying comprises identifying a plurality of block groups including the at least three blocks which satisfy the predetermined condition, and
the first graphic representation comprises a graphic representation of removing the plurality of block groups from the game interface and replacing the plurality of block groups with other blocks.

14. A non-transitory computer readable medium storing instructions which, when executed, cause at least one processor to carry out the game providing method of claim 1.

15. The game providing method of claim 1, wherein the plurality of blocks are provided by at least one of randomly or a predetermined algorithm.

16. The game providing method of claim 1, further comprising changing an appearance of at least one of the obstacle blocks when the requirement is satisfied.

17. The game providing method of claim 1, wherein:
the obstacle blocks include at least one of a second source or destination block;
the plurality of tiles includes a second set of special tiles being connected to each other from at least one of the source or destination blocks to the at least one of the second source or destination blocks; and
the requirement is satisfied based on whether the appearance of the second set of special tiles are changed.

18. The game providing method of claim 1,
the method further comprising identifying a second at least three blocks which satisfy the predetermined condition; and
displaying the first graphic representation includes displaying the first graphic representation of the at least three blocks and the second at least three blocks.

19. The game providing method of claim 18, wherein the first graphic representation includes:
simultaneously removing the at least three blocks and the second at least three blocks from the game interface and the corresponding tiles; and
replacing the corresponding tiles of the at least three blocks and the second at least three blocks with at least three other blocks.

20. A game providing apparatus, comprising:
a display;
an input interface;
a memory storing instructions; and
at least one processor configured to execute the instructions to:
display, on the display, a game interface comprising a plurality of tiles and a plurality of blocks respectively arranged on the plurality of tiles, wherein;
the plurality of blocks includes at least two obstacle blocks which are unmovable and not allowed to exchange their position with other blocks, and the obstacle blocks comprise a source block and a destination block; and
the plurality of tiles comprises ordinary tiles and special tiles, the special tiles being connected to each other from the source block to the destination block;
receiving, along an input interface, a user interaction;
changing, on the display, an arrangement of the plurality of blocks based on the user interaction;
identifying, by the at least one processors, at least three blocks of the plurality of blocks which satisfy a predetermined condition based on the arrangement;
display, on the display, a first graphic representation regarding the at least three blocks based on whether the predetermined condition is satisfied; and
display, on the display, a second graphic representation regarding at least three tiles respectively corresponding to the at least three blocks, wherein the second graphic representation comprises a graphic representation of changing an appearance of a second tile of the at least three tiles while a first tile of the at least three tiles remain unchanged, the second tile of the at least three tiles being one of the special tiles;
and
determining, by the at least one processors, if a requirement is satisfied based on whether the appearances of all the special tiles are changed, a requirement corresponding to the destination block is satisfied.

* * * * *